United States Patent
Falls et al.

(10) Patent No.: US 11,034,194 B2
(45) Date of Patent: Jun. 15, 2021

(54) WHEEL END ASSEMBLY FOR A TIRE INFLATION SYSTEM AND THE TIRE INFLATION SYSTEM MADE THEREWITH

(71) Applicant: DANA HEAVY VEHICLE SYSTEMS GROUP, LLC, Maumee, OH (US)

(72) Inventors: Shad J. Falls, Perrysburg, OH (US); William J. Foor, Clayton, MI (US); Christopher P. Lewark, Grand Rapids, OH (US); Jason M. Sidders, Perrysburg, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 282 days.

(21) Appl. No.: 15/769,891

(22) PCT Filed: Oct. 20, 2016

(86) PCT No.: PCT/US2016/057880
§ 371 (c)(1),
(2) Date: Apr. 20, 2018

(87) PCT Pub. No.: WO2017/070325
PCT Pub. Date: Apr. 27, 2017

(65) Prior Publication Data
US 2018/0304700 A1    Oct. 25, 2018

Related U.S. Application Data

(60) Provisional application No. 62/243,818, filed on Oct. 20, 2015, provisional application No. 62/333,535, filed on May 9, 2016.

(51) Int. Cl.
*B60C 23/00*    (2006.01)
*B60B 27/00*    (2006.01)
(Continued)

(52) U.S. Cl.
CPC ........ *B60C 23/003* (2013.01); *B60B 27/0073* (2013.01); *B60B 27/0068* (2013.01);
(Continued)

(58) Field of Classification Search
CPC ........................... B60C 23/001; B60C 23/003
See application file for complete search history.

(56) References Cited

U.S. PATENT DOCUMENTS 2,693,841 A    11/1954    Webster, Jr.
3,705,614 A    12/1972    Juttner
(Continued)

FOREIGN PATENT DOCUMENTS

DE    102004021161    11/2005
DE    102012101801    8/2013
(Continued)

OTHER PUBLICATIONS

International Search Report and Written Opinion for International Patent Application No. PCT/US2013/035588, dated Sep. 6, 2013, issued by the European Patent Office. 13 pages.
(Continued)

*Primary Examiner* — Jason R Bellinger
(74) *Attorney, Agent, or Firm* — McCoy Russell LLP

(57) ABSTRACT

A wheel end assembly for a tire inflation system includes a sealing ring disposed on an axle housing. The sealing ring includes a conduit formed therethrough in fluid communication with a conduit formed through a hub. The hub is rotatably disposed on the axle housing adjacent the sealing ring. An inner rotary seal is disposed between the sealing ring and the hub. An outer rotary seal is disposed between the sealing ring and the hub. The hub conduit is in fluid communication with the sealing ring conduit via an area between the inner rotary seal and the outer rotary seal. A bearing seal is disposed between the sealing ring and the (Continued)

hub. The bearing seal is disposed outboard of the outer rotary seal. The inner rotary seal, the outer rotary seal, and the bearing seal are each in sealing contact with the sealing ring.

15 Claims, 20 Drawing Sheets

(51) Int. Cl.
*B60T 8/171* (2006.01)
*B60T 8/1761* (2006.01)

(52) U.S. Cl.
CPC . *B60B 2900/351* (2013.01); *B60B 2900/5116* (2013.01); *B60T 8/171* (2013.01); *B60T 8/1761* (2013.01)

(56) References Cited

U.S. PATENT DOCUMENTS

| | | | |
|---|---|---|---|
| 3,858,950 A | 1/1975 | Otto | |
| 4,434,833 A | 3/1984 | Swanson | |
| 4,448,461 A | 5/1984 | Otto | |
| 4,470,506 A | 9/1984 | Goodell | |
| 4,492,019 A | 1/1985 | Wells | |
| 4,498,709 A | 2/1985 | Wells | |
| 4,705,090 A | 11/1987 | Bartos | |
| 4,730,656 A | 3/1988 | Goodell | |
| 4,804,027 A | 2/1989 | Runels | |
| 4,844,138 A | 7/1989 | Kokubu | |
| 4,892,128 A | 1/1990 | Bartos | |
| 5,203,391 A | 4/1993 | Fox | |
| 5,997,005 A | 12/1999 | Gold | |
| 7,931,061 B2 | 4/2011 | Gonska | |
| 8,397,774 B2 | 3/2013 | Gonska | |
| 8,616,254 B2 | 12/2013 | Kelley | |
| 9,446,637 B2 | 9/2016 | Knapke | |
| 9,539,865 B2* | 1/2017 | Lakin | B60C 23/003 |
| 10,059,156 B2* | 8/2018 | Knapke | B60C 23/10 |
| 2009/0084481 A1 | 4/2009 | Kalavitz | |
| 2011/0133046 A1* | 6/2011 | Lemerise | G01D 11/30 |
| | | | 248/230.8 |
| 2011/0162773 A1 | 7/2011 | Gonska | |
| 2015/0101722 A1 | 4/2015 | Lakin | |
| 2015/0107742 A1 | 4/2015 | Knapke | |
| 2015/0273958 A1* | 10/2015 | Stoychev | B60C 23/003 |
| | | | 152/415 |
| 2016/0318359 A1 | 11/2016 | Knapke | |
| 2016/0368331 A1* | 12/2016 | Keeney | B60C 23/003 |
| 2020/0094621 A1* | 3/2020 | Slesinski | B60B 35/14 |

FOREIGN PATENT DOCUMENTS

| | | |
|---|---|---|
| EP | 0071278 | 2/1983 |
| EP | 0130477 | 1/1985 |
| EP | 0521719 | 1/1993 |
| EP | 0588595 | 3/1994 |
| GB | 2223207 | 4/1990 |
| JP | 2006088809 | 4/2006 |
| JP | 2007131151 | 5/2007 |
| WO | 2012031880 | 3/2012 |
| WO | 2012084690 | 6/2012 |
| WO | 2013154976 | 10/2013 |

OTHER PUBLICATIONS

International Search Report and Written Opinion for International Patent Application No. PCT/US2016/057880, dated Jan. 19, 2017, issued by the European Patent Office. 10 pages.

* cited by examiner

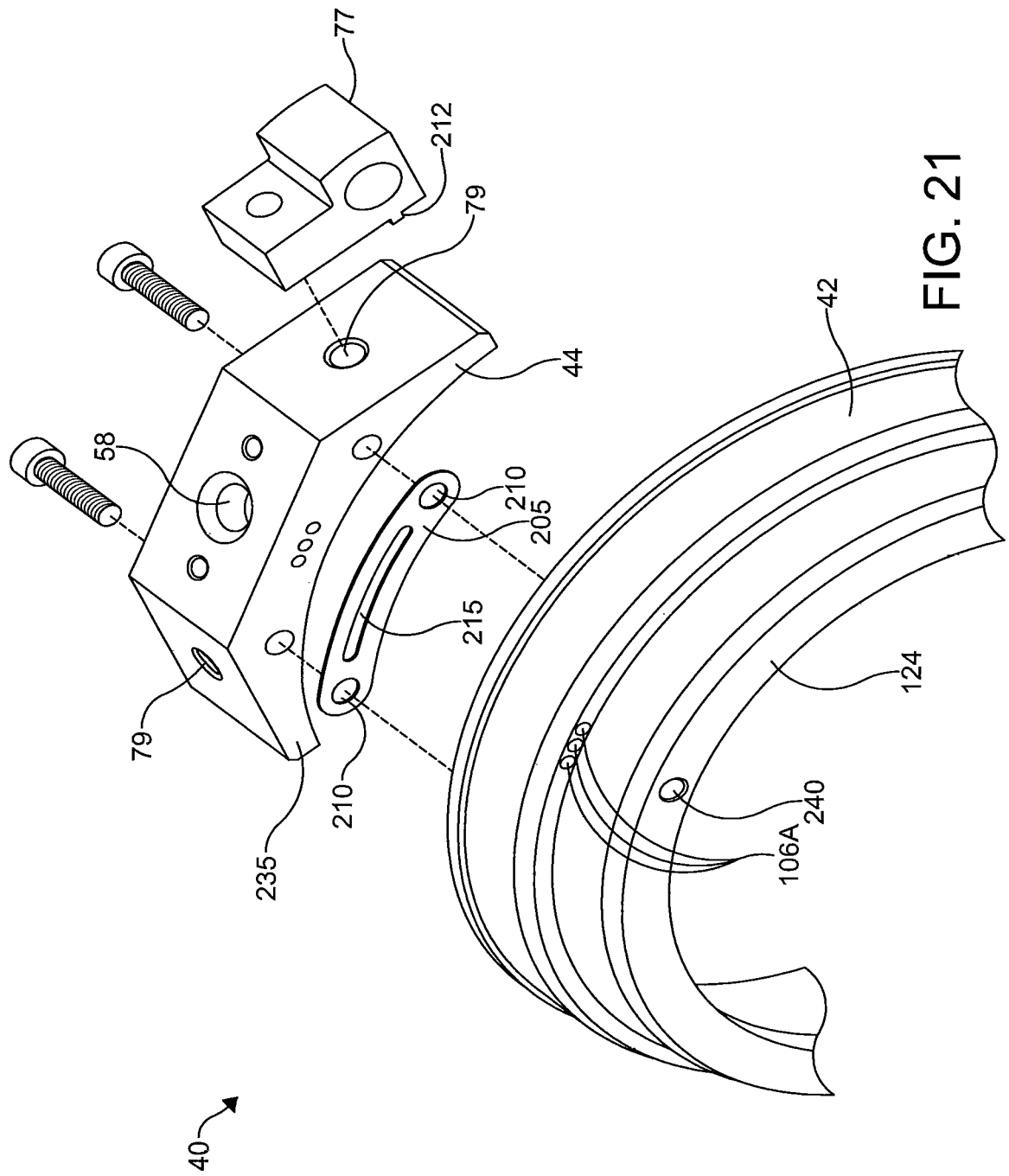

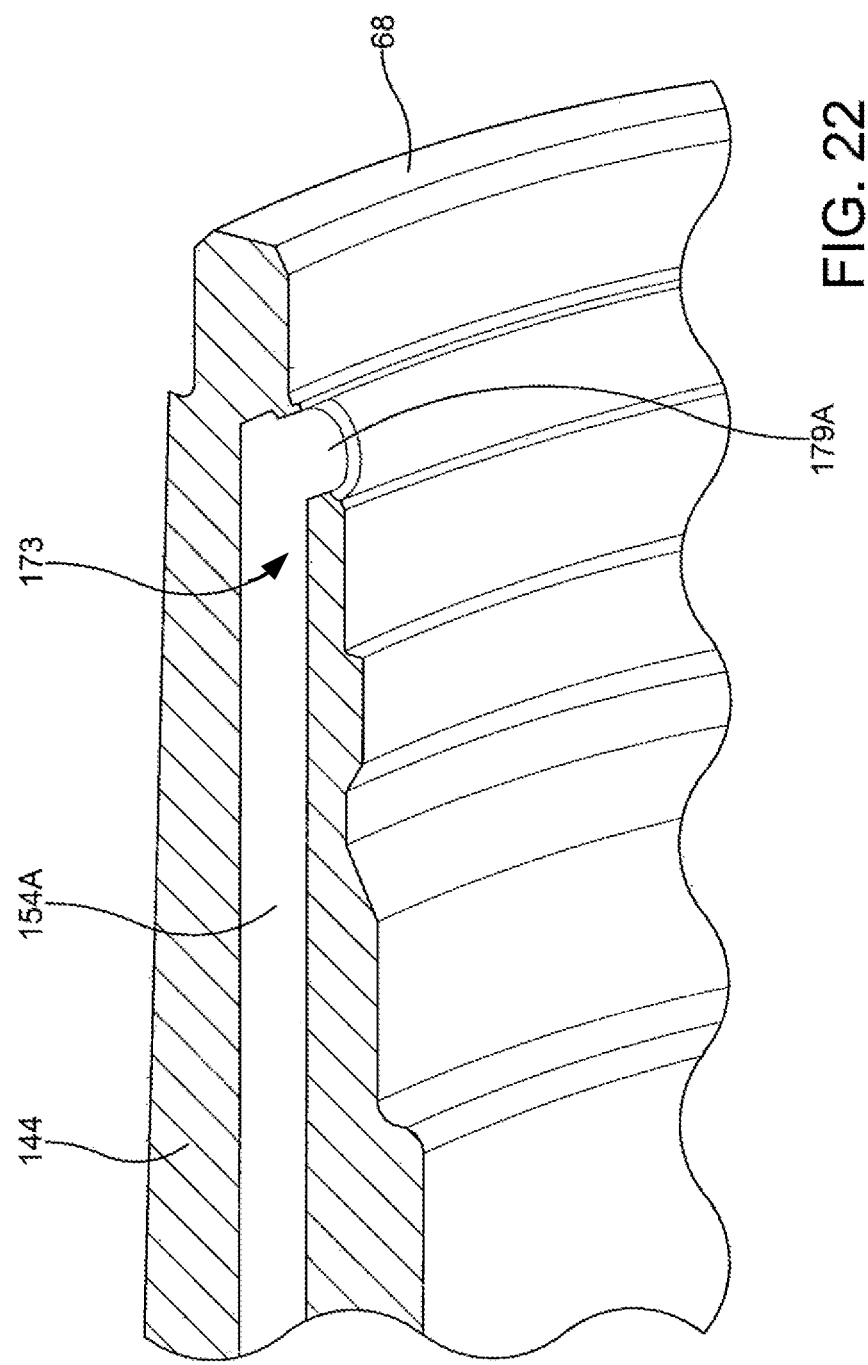

US 11,034,194 B2

WHEEL END ASSEMBLY FOR A TIRE INFLATION SYSTEM AND THE TIRE INFLATION SYSTEM MADE THEREWITH

BACKGROUND

The present subject matter relates to a wheel end assembly for a tire inflation system. The present subject matter also relates to a tire inflation system made with the wheel end assembly.

Tire inflation systems may be utilized with vehicles and are often used to provide a vehicle with the versatility to maneuver over differing terrain types and to reduce maintenance requirements. For example, a wheel assembly in fluid communication with a tire inflation system may have a tire pressure which can be lowered to provide additional traction for the vehicle or raised to reduce the rolling resistance and increase the fuel efficiency of the vehicle. Additionally, utilizing a tire inflation system may eliminate the need to manually periodically check and adjust the tire pressure. However, tire inflation systems are difficult to install on drive axles due to the increased complexities associated therewith, spacing requirements, and associated costs.

Thus, it would be desirable to provide a wheel end assembly that includes one or more of the aforementioned advantages and overcomes the aforementioned difficulties. A tire inflation system made with the wheel end assembly would also be desirable.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teaching of the present disclosure and do not illustrate all possible implementations thereof. The drawings are not intended to limit the scope of the present disclosure in any way.

FIG. 21 depicts a front perspective view of a portion of the sealing ring of FIG. 20; and FIG. 22 depicts a partial sectional view of a hub according to an embodiment of the presently disclosed subject matter;

DETAILED DESCRIPTION

Figure 1:
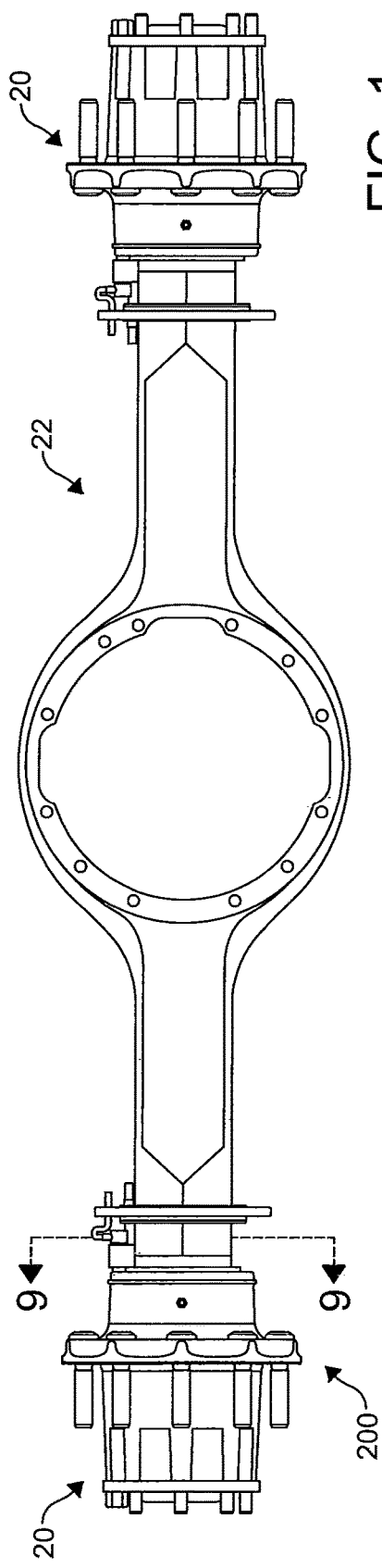
FIG. 1 depicts a front view of a wheel end assembly for a drive axle in accordance with the invention.

It is to be understood that the invention may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless the claims expressly state otherwise. Also, although they may not be, like elements in various embodiments described herein may be commonly referred to with like reference numerals within this section of the application.

Embodiments of a wheel end assembly 20 and a tire inflation system 200 are described herein. The wheel end assembly will be described in connection with a vehicle (not depicted). It would be understood by one of ordinary skill in the art that the various embodiments of the wheel end assembly described herein may have applications to commercial and off-highway vehicles. Furthermore, it would be understood by one of ordinary skill in the art that these embodiments could have industrial, locomotive, military, and aerospace applications, as well as applications in consumer, electric, and autonomous or semi-autonomous vehicles.

Figure 2:
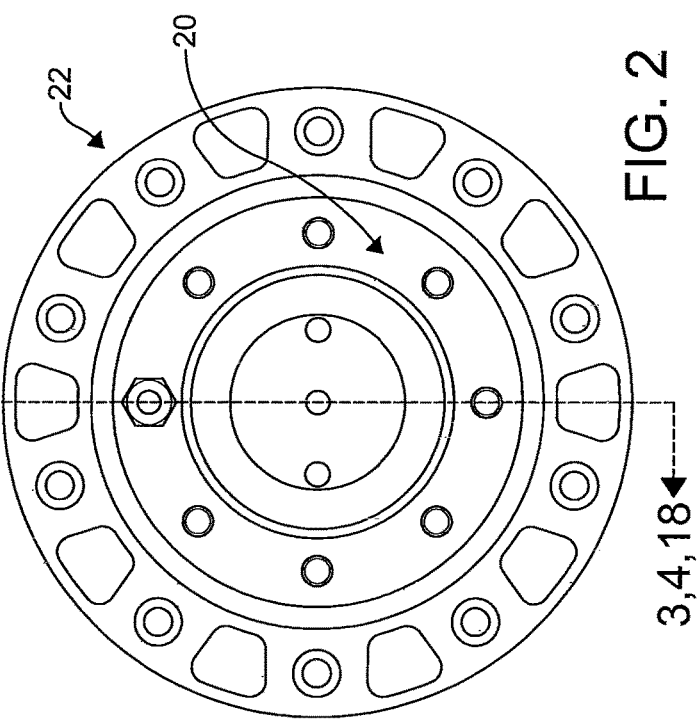
FIG. 2 depicts an end view of the wheel end assembly of FIG. 1.

Embodiments of the wheel end assembly 20 may be used with a drive axle assembly 22. An embodiment of the drive axle assembly 22 is illustrated in FIGS. 1 and 2. As shown in FIG. 1, the drive axle assembly 22 may comprise two wheel end assemblies 20. It should be appreciated that the wheel end assembly 20 may be used apart from a drive axle assembly. For example, in certain embodiments (not depicted), the wheel end assembly 20 may be used with a steer axle assembly.

Figure 3:
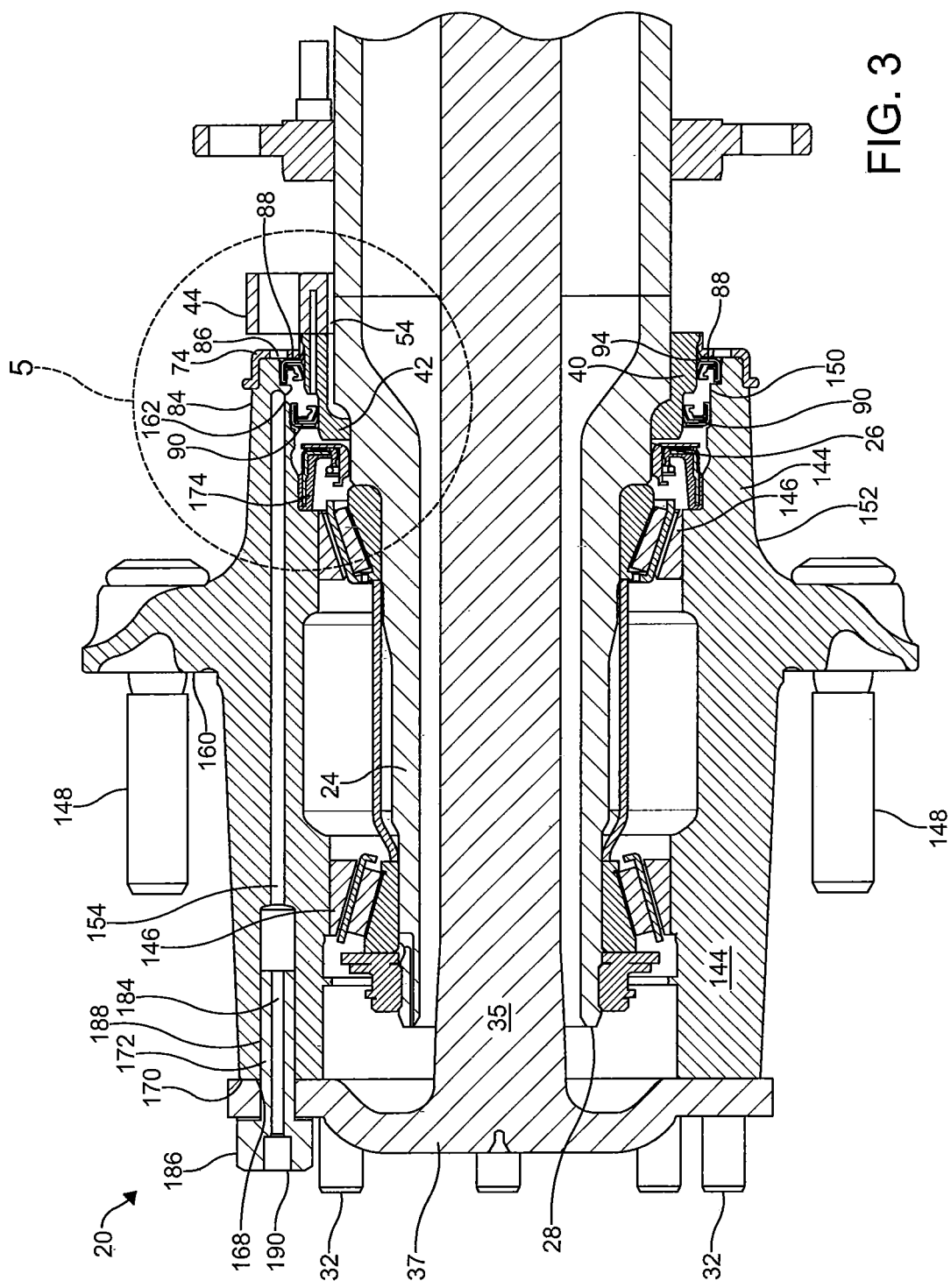
FIG. 3 depicts a cross-sectional view of a portion of the drive axle of FIG. 2 along line 3-3 and illustrates an embodiment of the wheel end assembly in accordance with the invention.
Figure 4:
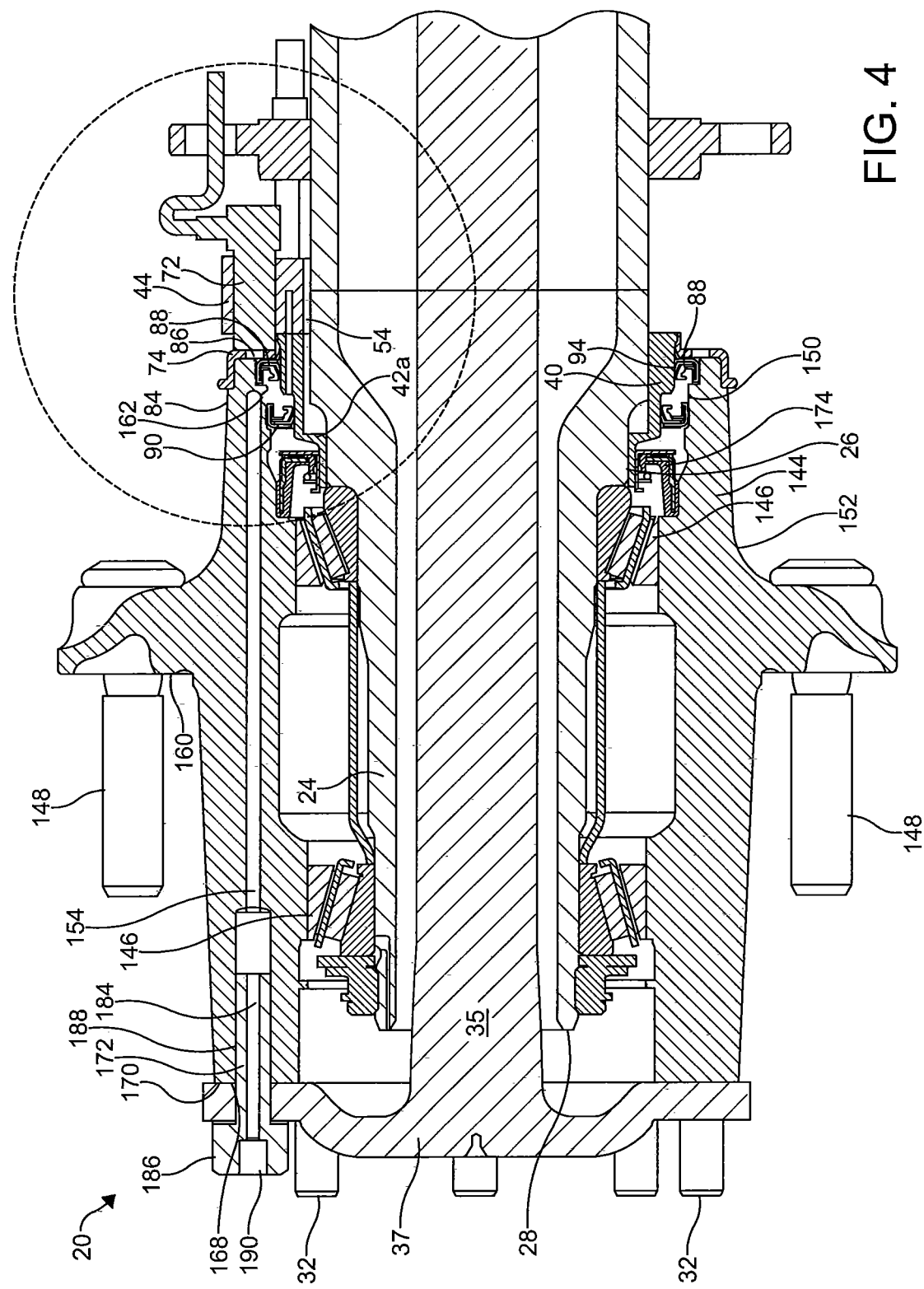
FIG. 4 depicts a cross-sectional view of a portion of the drive axle of FIG. 2 along line 4-4 and illustrates another embodiment of the wheel end assembly in accordance with the invention.

The wheel end assembly 20 is utilized to transfer pressurized air between portions of the tire inflation system 200. As illustrated in FIGS. 3-4, the wheel end assembly 20 comprises an axle housing 24. The axle housing 24 may be formed unitarily or may comprise a plurality of components coupled together. The axle housing 24 is a hollow member in which an axle 35 is rotatably disposed. In an embodiment, the axle housing 24 comprises an outer surface 26 having a stepped, substantially cylindrical shape with a diameter which reduces toward an outboard end 28 thereof.

The axle 35 is rotatably disposed in the axle housing 24 and may be a drive axle. The axle 35 may include a flanged end 37, and the flanged end 37 may have a plurality of perforations formed therethrough for coupling the axle to a hub assembly 30. The axle may be coupled with the hub assembly 30 with a plurality of threaded fasteners 32. However, it should be understood that the axle 35 may be coupled with the hub assembly 30 in any other conventional manner.

Referring now to FIGS. 3-17, the wheel end assembly 20 may comprise a sealing ring 40, 40A, 40B. The sealing ring 40, 40A, 40B and the hub assembly 30 are fitted to the axle housing 24. The sealing ring 40, 40A, 40B and the hub assembly 30 are disposed about the outer surface 26 of the axle housing 24. In an embodiment, the sealing ring 40, 40A, 40B is non-rotatably disposed on the outer surface 26 of the axle housing 24. The sealing ring 40, 40A, 40B may be coupled with the outer surface 26 of the axle housing 24 via methods including, but not limited to, a press-fit, a line-to-line adhesive, a shrink-fit, or a line-to-line weld.

Figure 7:
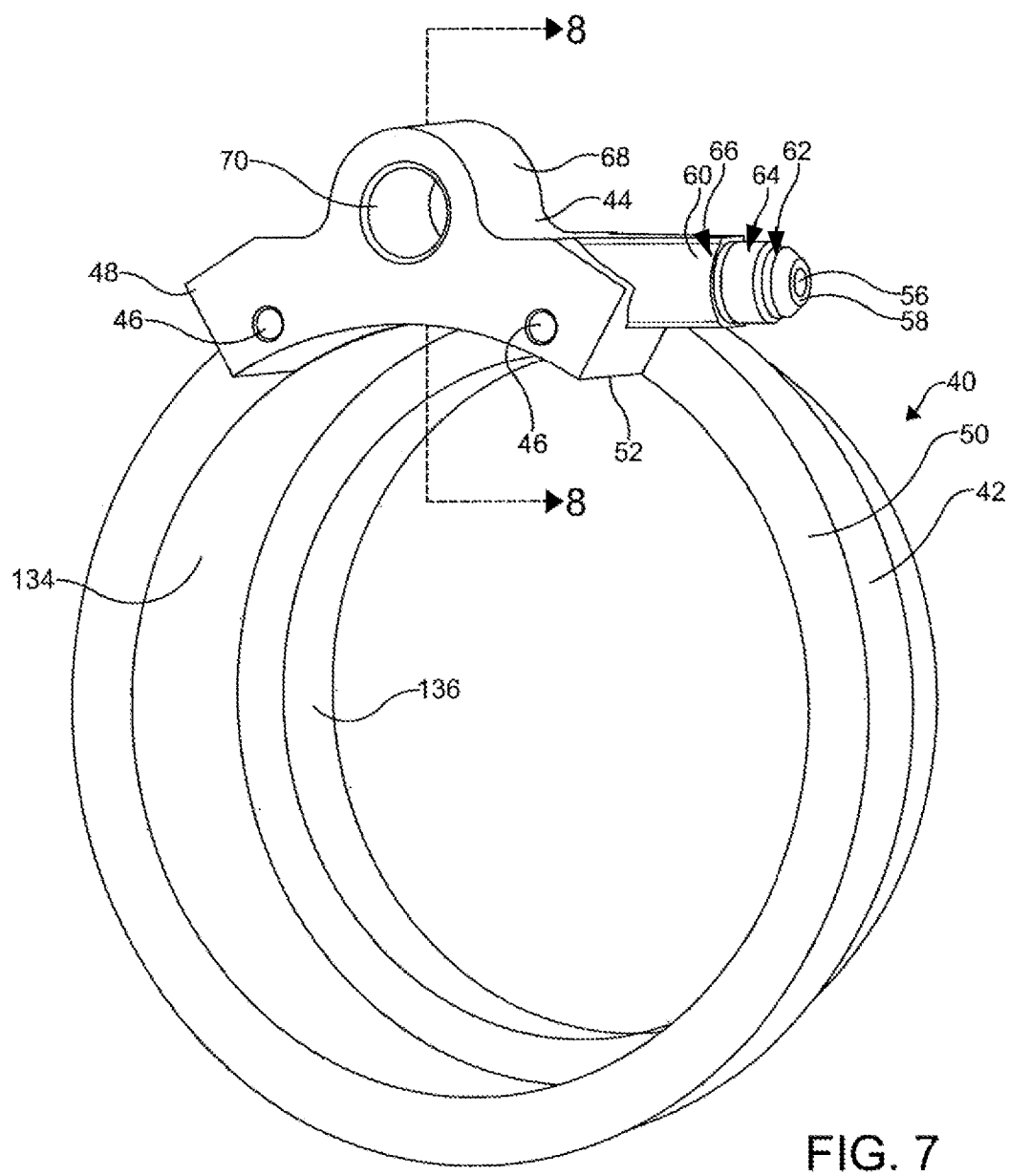
FIG. 7 depicts a perspective view of the sealing ring shown in the embodiment of the wheel end assembly of FIG. 3.

The sealing ring 40, 40A, 40B is a generally annular member and may be metallic. The sealing ring 40, 40A, 40B comprises a sealing portion 42, 42A and an anti-lock brake system (hereinafter "ABS") sensor portion 44, 44B. The sealing portion 42, 42A and the ABS sensor portion 44, 44B are attached via one or more fasteners (not depicted). Referring now to FIG. 7, each fastener is disposed through a fastener hole 46. The fastener holes 46 may be formed in an inboard end surface 48 of the ABS sensor portion 44, 44B and extend into the sealing portion 42, 42A to secure the sealing portion 42, 42A, and the ABS sensor portion 44, 44B to each other.

Figure 17:
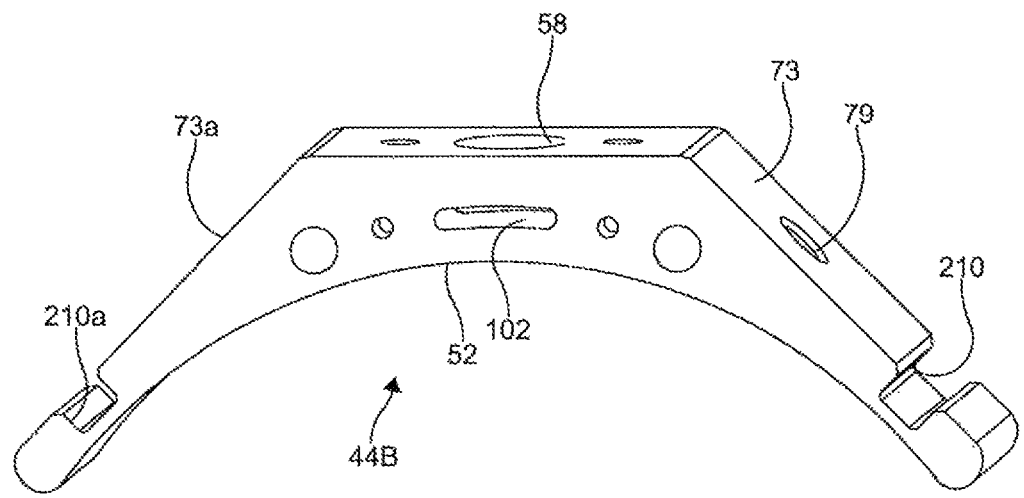
FIG. 17 depicts a front perspective view of the portion of the ABS sensor portion of FIG. 16.

In an embodiment, the ABS sensor portion 44, 44B is attached to an inboard end surface 50 of the sealing portion 42, 42A. The inboard end surface 50 of the sealing portion 42, 42A is the inboard most surface of the sealing portion 42, 42A. However, when attached to the sealing portion 42, 42A, the ABS sensor portion 44, 44B defines the inboard most surface of the sealing ring 40, 40A, 40B. The ABS sensor portion 44, 44B also comprises an inner surface 52. The inner surface 52 is disposed over a portion of the outer surface 26 of the axle housing 24. As best illustrated in FIGS. 7 and 17, the inner surface 52 may be curvilinear. Referring to FIG. 4, a space 54 may separate the inner surface 52 of the ABS sensor portion 44, 44B from the outer surface 26 of the axle housing 24.

A flow passageway 56 is formed through the sealing ring 40, 40A, 40B for directing the flow of pressurized air through the sealing ring 40, 40A, 40B. The flow passageway 56 comprises an inlet 58. In an embodiment, like the one illustrated in FIG. 7, the flow passageway 56 is formed through a boss 60 that extends in a radial direction from the ABS sensor portion 44. The boss 60 is hollow and may comprise a stepped, generally cylindrical shape. The boss 60 comprises a plurality of generally cylindrical portions 62, 64, 66. The generally cylindrical portions 62, 64, 66 each have an outer diameter. The outer diameters vary in size between the portions 62, 64, 66.

Figure 14:
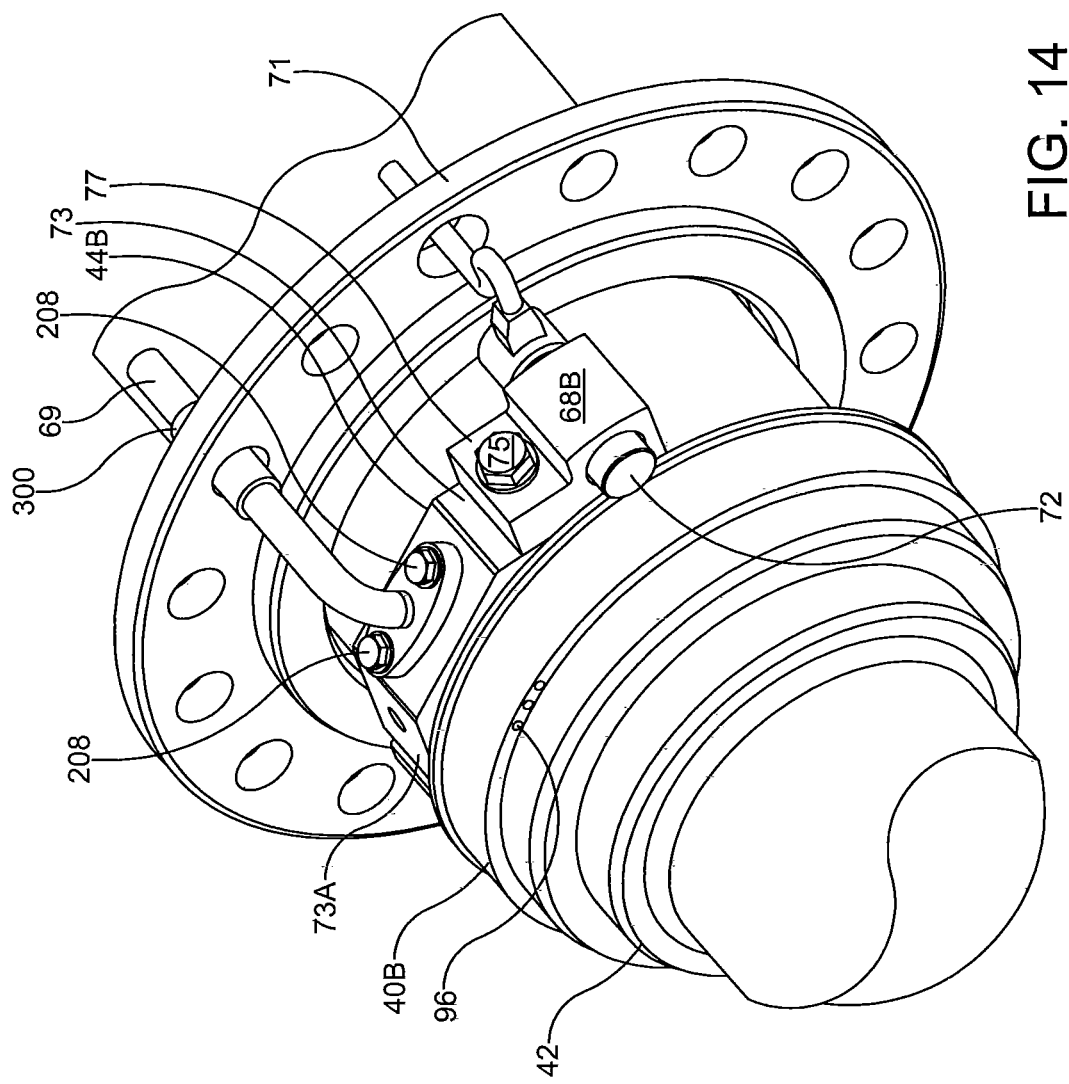
FIG. 14 depicts a perspective end view of an embodiment of the wheel end assembly with the axle, hub assembly and rotary seals removed for clarity.
Figure 15:
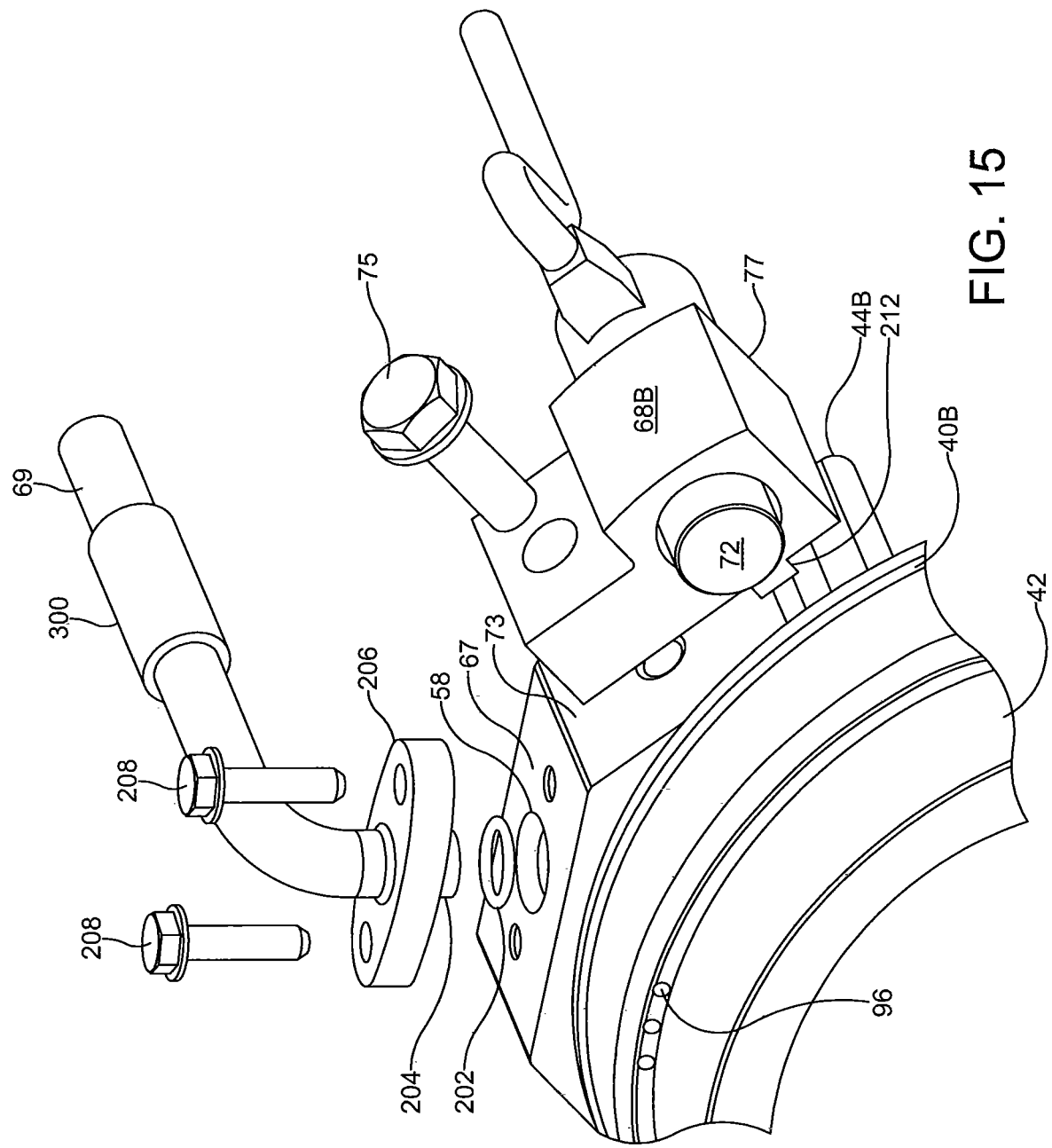
FIG. 15 depicts a perspective top view of the embodiment of the wheel end assembly of FIG. 14.

In another embodiment, like the one shown in FIGS. 14 and 15, the sealing ring 40B does not include a boss. In this embodiment, the inlet 58 is formed in an outer surface 67 of the sealing ring 40B ABS sensor portion 44B. In an embodiment, the inlet 58 is formed in an outer surface of the ABS sensor portion 44B. The inlet 58 is in fluid communication with a pump conduit 69 which is in communication with a fluid pump (not depicted). As illustrated in FIGS. 14 and 15, the pump conduit 69 may extend through an aperture formed in a brake backing plate 71 disposed on the axle housing 24. A vibration damper 300 may be disposed around the portion of the pump conduit 69 that extends through the aperture in the brake backing plate 71. In an embodiment, the vibration damper 300 is formed of an elastomeric material such as rubber, and is a hollow cylindrical member. The pump conduit 69 is attached to the sealing ring 40B via the outer surface of the ABS sensor portion 44B. As illustrated in FIG. 15, a seal member 202 may be provided around an outlet 204 of the pump conduit 69 and between the outer surface 67 of the sealing ring 40B ABS sensor portion 44B and a flange 206. One or more fasteners 208 are disposed through the flange 206 to attach the pump conduit 69 to the sealing ring 40B.

The ABS sensor portion 44, 44B may comprise an ABS sensor mount 68, 68B. In the embodiment illustrated in FIG. 7, the boss 60 is formed in a unitary manner with the ABS sensor mount 68. Alternatively, in an embodiment, as illustrated in FIG. 14, the ABS sensor mount 68B and the ABS sensor portion 44B of the sealing ring 40B may be formed as separate portions. In this embodiment, the ABS sensor mount 68B comprises an ABS sensor block 77, and the ABS sensor portion 44B comprises a plate 73. The plate 73 is formed in a unitary manner with the ABS sensor portion 44B. The ABS sensor block 77 may be attached to the plate 73 via a fastener 75. In an embodiment, the ABS sensor portion 44B comprises a curvilinear radially inner surface 52 having a diameter equal to a first diameter surface 128 (further discussed intra) of the sealing portion 42. The ABS sensor portion 44B outer surface 67 may further comprise a first surface 67A, a second surface 67B, and a third surface 67C. The first and second outer surfaces 67A, 68B may disposed on either side of the third outer surface 68C at an oblique angle thereto.

Figure 16:
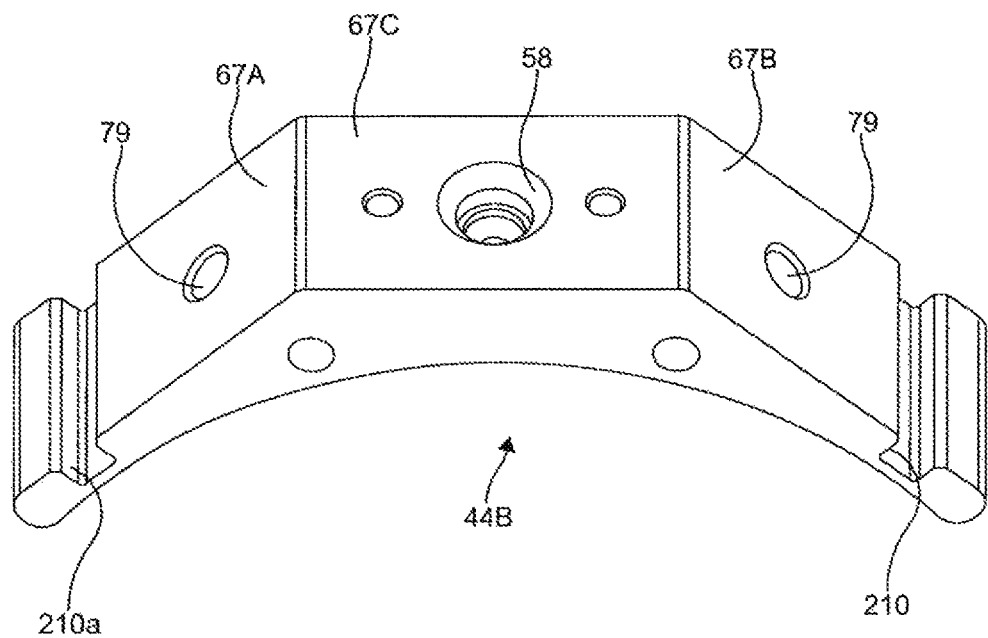
FIG. 16 depicts a perspective view of an embodiment of a portion of an ABS sensor portion utilized in the wheel end assembly of FIG. 14.
Figure 20:
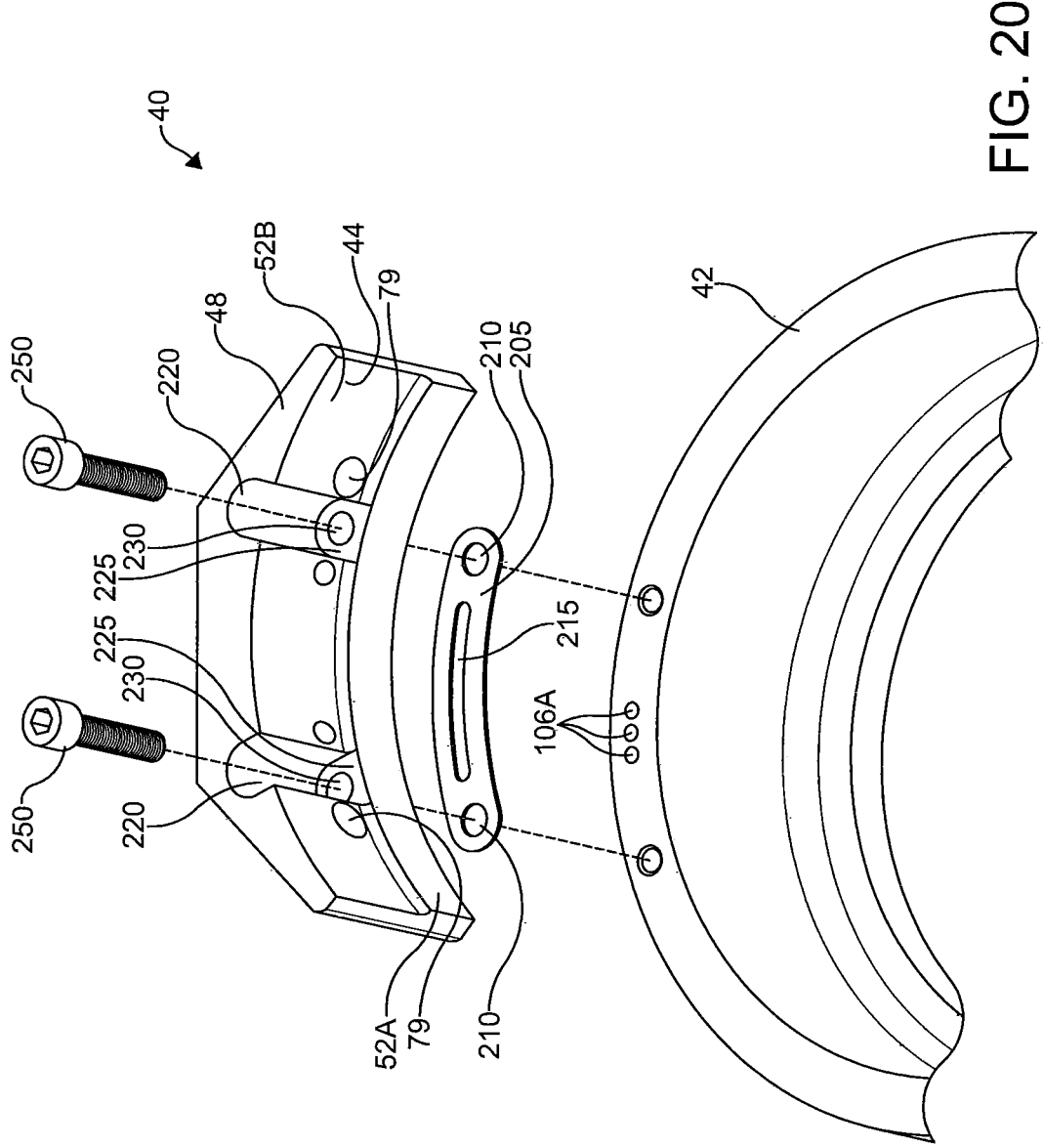
FIG. 20 depicts a perspective view of a portion of the sealing ring according to an embodiment of the presently disclosed subject matter.

As best illustrated in FIGS. 16-17, in certain embodiments, the ABS sensor portion 44B comprises the plate 73 and a second plate 73A, which may be referred to hereinafter as the pair of plates 73, 73A, integrally disposed on opposite sides of the ABS sensor portion 44B on the first and second outer surfaces 67A, 67B. Utilizing this embodiment allows the ABS sensor block 77 to be attached to either side of the ABS sensor portion 44B. Each plate 73, 73A may have an axially extending slot 210, 210A. A portion 212 of the ABS sensor block 77 may be disposed in the slot 210, 210A when the ABS sensor block 77 is attached to the plate 73, 73A. In other embodiments, as illustrated in FIGS. 20 and 21, no slot is provided in the plate 73, 73A. In these embodiments, the ABS sensor block 77 mounts against one of the plates 73, 73A and the portion 212 of the ABS sensor block 77 abuts an end surface of the plate 73, 73A it is mounted to.

The plate 73, 73A further comprises an aperture 79 therethrough. In an embodiment, the aperture 79 may include a threaded portion. The ABS sensor block 77 may be coupled to the plate 73 via the fastener 75 which is disposed in the aperture 79.

Further, as illustrated in FIGS. 20 and 21, in an embodiment, a seal 205 may be disposed between the sealing portion 42 and she ABS sensor portion 44 of the sealing ring 40 to prevent pressurized fluid escaping therebetween. The seal 205 may include fastener apertures 210 and a fluid aperture 215. The fluid aperture 215 may comprise a geometry which permits fluid communication between the portion 102 of the flow passageway 56 and the portion 106, 106A of the flow passageway 56.

The ABS sensor portion 44 may include bolt pockets 220 extending axially from the inboard end surface 48 toward the sealing portion 42. The bolt pockets 220 may have a semi-cylindrical shape. An inner surface 225 of each bolt pocket 220 is disposed substantially parallel to the inboard end surface 48. Fastener apertures 230 may be disposed through the inner surface 225 and an outboard end surface 235 of the ABS sensor portion 44. In an embodiment, the fastener apertures 230 are coaxial with the bolt pockets 220. A pair of fasteners 250 may be disposed through the fastener apertures 230 to couple the ABS sensor portion 44 with the sealing portion 42. The bolt pocket 220 design permits shorter fasteners 250 to be utilized to couple the ABS sensor portion 44 with the sealing portion 42. In addition, as illustrated in FIG. 21, the sealing portion 42 may include a blind hole 240 located in the outboard end surface 124 of the sealing portion 42. The blind hole 240 may interface with an alignment pin (not depicted) for assembly tooling.

As illustrated in FIG. 20, the ABS sensor portion inner surface 52 may include a first surface 52A and a second surface 52B. The second surface 52B is disposed on an end of the ABS sensor portion 44 opposite the sealing portion 42. The diameter of the second surface 52B is larger than the diameter of the first surface 52A to provide clearance between the first surface 52A and the axle housing 24. In an embodiment, the clearance between the first surface 52A and the axle housing 24 permits the ABS sensor portion 44 to be positioned over a friction weld on the axle housing 24.

Figure 6:
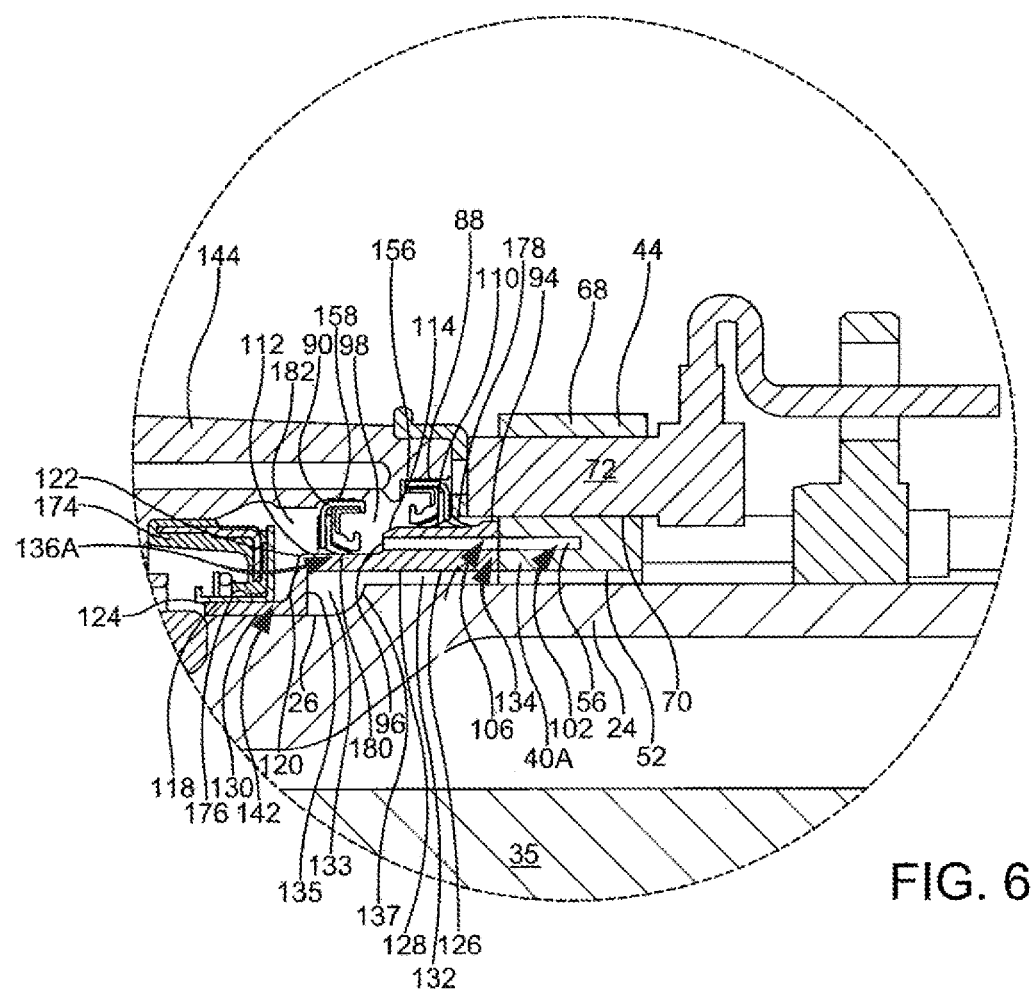
FIG. 6 depicts an enlarged view of a portion of the wheel end assembly of FIG. 4.
Figure 9:
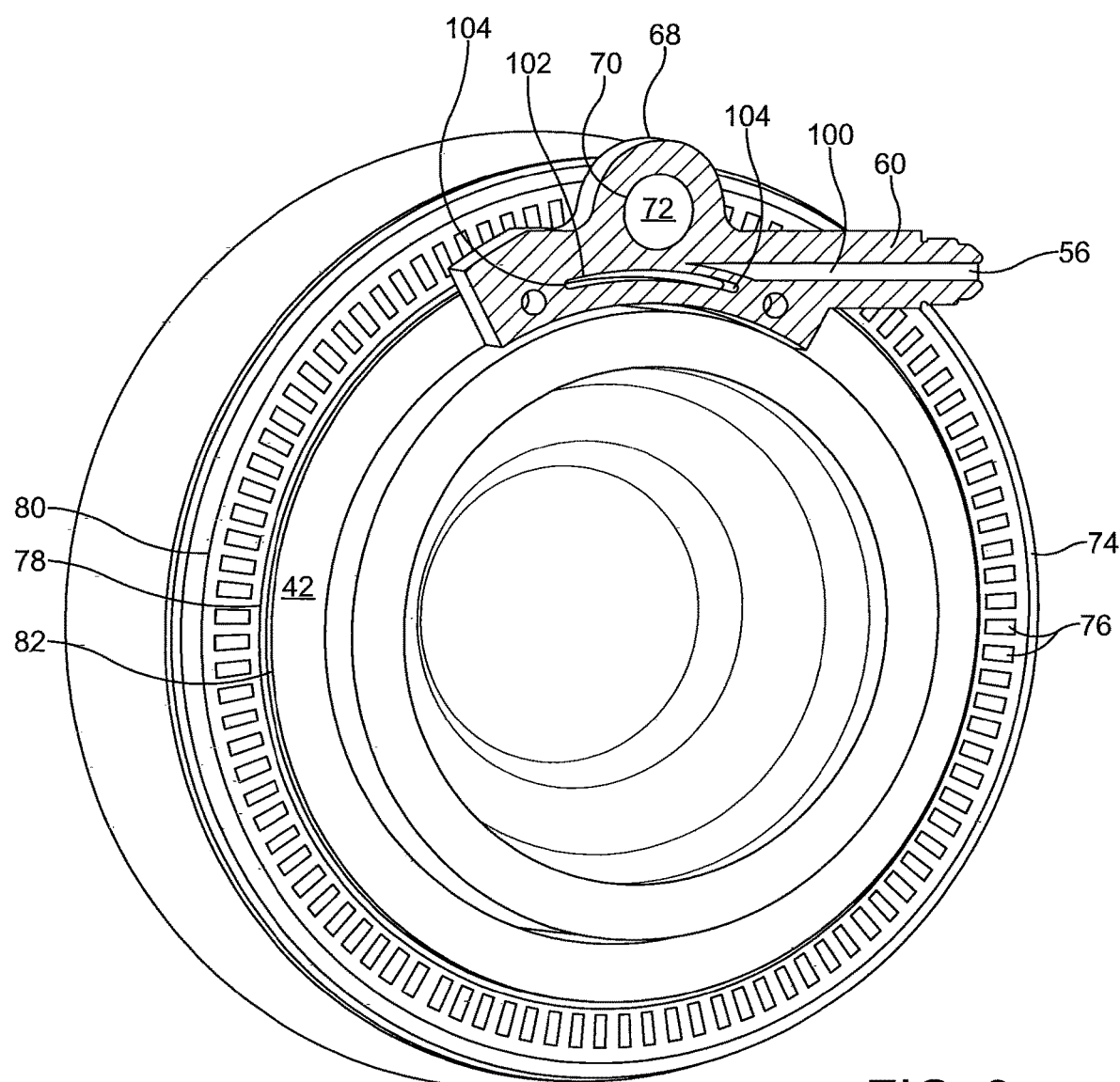
FIG. 9 depicts a sectional view of a portion of the drive axle of FIG. 1 taken along line 9-9 and illustrates an embodiment of the wheel end assembly in accordance with the invention.

As shown in FIGS. 6 and 14, the ABS sensor mount 68, 68B comprises a center opening 70 which holds an ABS sensor 72. The ABS sensor 72 is provided through the center opening 70 and is disposed inboard of a tone ring 74 (see FIGS. 3, 4, and 9). The ABS sensor 72 extends into the center opening 70 to read a rotational rate of the tone ring 74 and may be utilized to determine the speed of the vehicle. Tone rings known in the art are suitable for use in the wheel end assembly 20. In certain embodiments, as illustrated in FIG. 9, the tone ring 74 comprises a plurality of apertures 76 and is generally ring-shaped. In this embodiment, the tone ring 74 comprises an inner diameter 78, which defines a major aperture, and an outer diameter 80. The inner diameter 78 is greater than an outer diameter 82 of the sealing portion 42, 42A, such that the tone ring 74 can be positioned around a portion of the sealing portion.

The tone ring 74 is attached to the outer surface 84 of the hub assembly 30 at the inboard end 86 thereof. In this location, the tone ring 74 is positioned between the inboard end 86 of the hub assembly 30 and the ABS sensor mount 68. In an embodiment, the tone ring 74 is press-fit onto the hub assembly 30 and is provided inboard of an inner rotary seal 88 and an outer rotary seal 90. In an embodiment, the tone ring 74 abuts the inner rotary seal 88. In this embodiment, the tone ring 74 prevents the inner rotary seal 88 from moving axially inboard along an outer surface 94 of the sealing portion 42, 42A.

Figure 8:
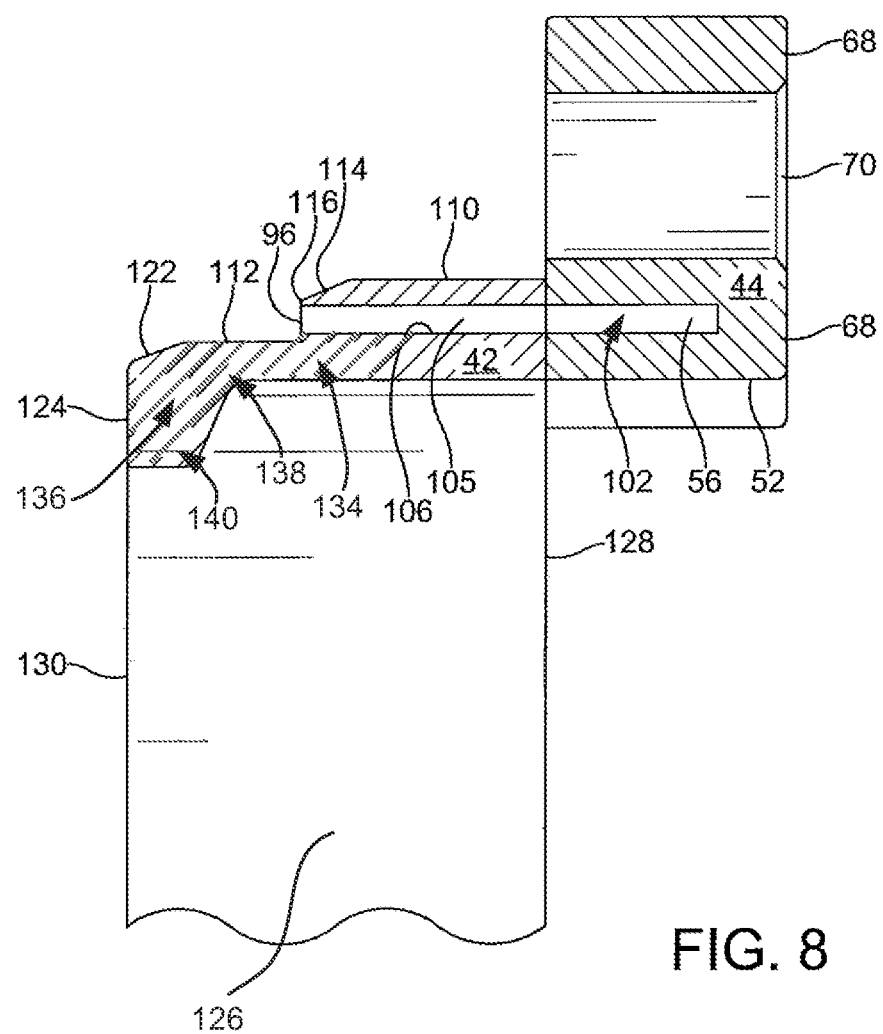
FIG. 8 depicts a sectional view of the sealing ring of FIG. 7 taken along line 8-8.

As noted above, at the inlet 58, the flow passageway 56 is in fluid communication with a pump conduit 69. In an embodiment, as illustrated in FIG. 8, an outlet 96 of the flow passageway 56 is formed in the outer surface 94 of the sealing portion 42, 42A. The outlet 96 is in fluid communication with a chamber 98 defined between the inner rotary seal 88 and the outer rotary seal 90 (see FIGS. 5 and 6). In an embodiment, the chamber 98 may be annular.

In an embodiment, as illustrated in FIG. 9, a portion 100 of the flow passageway 56 extends through the boss 60. The portion 100 extending through the boss 60 may comprise a cylindrical shape. The cylindrical-shaped portion 100 of the fluid passageway 56 may be in fluid communication with a portion 102 of the flow passageway 56 formed in the ABS sensor portion 44, 44B. In the embodiment illustrated in FIG. 9, the portion 102 of the flow passageway 56 formed in the ABS sensor portion 44, 44B may comprise a substantially crescent shape having rounded end portions 104. In certain embodiments, the portion 102 of the flow passageway 56 formed in the ABS sensor mount 68, 68B is of a slot configuration such that the portion 102 is of a length that is greater than its height.

In other embodiments, as illustrated in FIG. 14, where a boss is not provided, the inlet 58 is in direct fluid communication with the portion 102 of the flow passageway 56 formed in the ABS sensor portion 44B of the sealing ring 40B.

Figure 5:
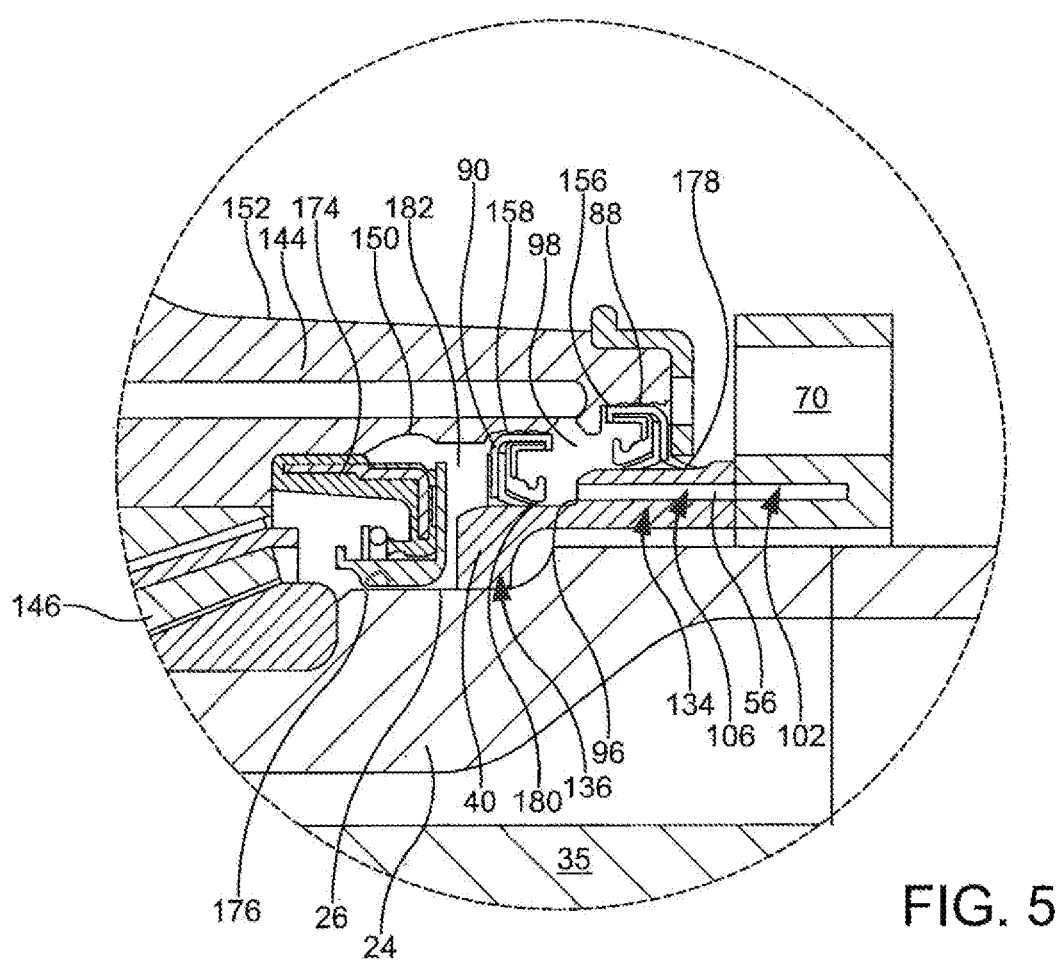
FIG. 5 depicts an enlarged view of a portion of the wheel end assembly of FIG. 3.

In the embodiments illustrated in FIGS. 5 and 6, the portion 102 of the flow passageway 56 formed in the ABS sensor portion 44, 44B extends axially to communicate with a portion 106 of the flow passageway 56 formed in the sealing portion 42, 42A. In an embodiment, the portion 102 of the flow passageway 56 formed in the ABS sensor portion 44, 44B, and the portion 106 of the flow passageway 56 formed in the sealing portion 42, 42A are aligned. Also, the sealing member 205, as illustrated in FIGS. 20 and 21, may be provided about the interface of the flow passageway portion 102 formed in the ABS sensor portion 44, 44B and the flow passageway portion 106 formed in the sealing portion 42, 42A. The sealing member 205 may prevent pressurized air being transferred through the sealing ring 40, 40A, 40B conduit 56 from escaping the tire inflation system 200. In an embodiment, the sealing member 205 is a gasket.

The portion 106 of the flow passageway 56 formed in the sealing portion 42, 42A may be of a general crescent shape having rounded end portions. In certain embodiments, the portion 106 of the flow passageway 56 formed in the sealing portion 42, 42A is of a slot configuration such that the portion 106 is of a length that is greater than its height. In other embodiments, as illustrated in FIGS. 14, 20, and 21, the flow passageway 56 formed in the sealing portion 42, 42A comprises a plurality of flow conduits 106A. The plurality of flow conduits 106A may be individual and spaced apart from each other through the sealing portion 42, 42A. In an embodiment, the plurality of flow conduits 106A are disposed in a single plane. In another embodiment, the plurality of flow conduits 106A are circumferentially spaced apart. In one embodiment, three flow conduits 106A may be provided. In another embodiment, nine flow conduits 106A may be provided. Each flow conduit 106A extends axially from the portion 102 of the flow passageway 56 formed in the ABS sensor portion 44, 44B to the outer surface 94 of the sealing portion 42, 42A. Thus, in an embodiment, the flow conduits 106A define the outlet of the flow passageway 56 and are in fluid communication with the chamber 98 defined between the inner rotary seal 88 and the outer rotary seal 90. In an embodiment, each flow conduit 106A may be of a cylindrical shape.

The outer surface 94 of the sealing portion 42, 42A is of a general cylindrical shape having a plurality of different diameters. In an embodiment, as illustrated in FIGS. 3, 5, 6, 7, and 8, the outer surface 94 may comprise a first diameter surface 110 and a second diameter surface 112. The first diameter surface 110 has a diameter which is greater than that of the second diameter surface 112. The first diameter surface 110 may include a ramped transition surface 114. The outlet 96 of the conduit may be formed in an outboard facing surface 116. The outboard facing surface 116 may be substantially transverse the first and second diameter surfaces 110, 112 (see FIG. 8). Further, the outboard facing surface 116 may be defined by the ramped transition surface 114 and the second diameter surface 112. In other embodiments (not depicted), the outlet 96 may be formed in another portion of the outer surface of the sealing portion 42, 42A. For example, the outlet 96 may be formed in the first diameter surface 110, the second diameter surface 112, or the ramped transition surface 114.

In another embodiment, as illustrated in FIG. 6, the outer surface 94 may further comprise a third diameter surface 118. The second diameter surface 112 may be attached to the third diameter surface 118 by a ramped transition surface 120. The ramped transition surface 120 is a substantially outboard facing surface. The second diameter surface 112 has a diameter which is greater than that of the third diameter surface 118.

The sealing portion 42, 42A may also comprise a chamfered portion 122. As best illustrated in FIG. 8, the chamfered portion 122 is defined by the second diameter surface 112 and an outboard end surface 124 of the sealing portion 42, 42A. In another embodiment, best illustrated in FIG. 6, the chamfered portion 122 is attached to the second diameter surface 112 and the ramped transition surface 120. In this embodiment, the third diameter surface 118 is attached to the outboard end surface 124 of the sealing portion 42A.

The sealing portion 42, 42A also comprises an inner surface 126. The inner surface 126 of the sealing portion 42, 42A comprises a first diameter surface 128 and a second diameter surface 130. The first diameter surface 128 is aligned with the inner surface 52 of the ABS sensor portion 44. The first diameter surface 128 has a diameter which is greater than that of the second diameter surface 130. As noted above, it is preferred that the sealing ring 40, 40A, 40B is press-fit to the outer surface 26 of the axle housing 24. When the sealing ring 40, 40A, 40B is press-fit to the outer surface 26 of the axle housing 24, the second diameter surface 130 is engaged with the outer surface 26 of the axle housing 24. In an embodiment, a space 132 is provided between the outer surface 26 of the axle housing 24 and the first diameter surface 128 of the inner surface 126 of the sealing portion 42, 42A. Also, in the embodiment illustrated in FIG. 6, a space 133 separates an inner ramped transition surface 135 from the outer surface 26 of the axle housing 24. The space 133 extends axially from a shoulder 137 of the axle housing 24 to the inner ramped transition surface 135. In this embodiment, the inner ramped transition surface 135 is attached on an end to the first diameter surface 128 and, on an opposite end, to the second diameter surface 130. Providing space 132, 133 between the outer surface 26 of the axle housing 24 and the inner surface 126 of the sealing portion 42, 42A reduces the amount of press force required to attach the sealing ring 40, 40A, 40B to the axle housing 24.

The sealing ring 40, 40A, 40B may also comprise portions of different thicknesses. In certain embodiments like the one illustrated in FIGS. 5, 7, and 8, the sealing ring 40 comprises a first portion 134 and a second portion 136. In this embodiment, the first portion 134 may be of a substantially constant thickness or have a portion which gradually reduces in thickness toward the second portion 136. Also, in an embodiment, the second portion 136 comprises an inboard portion 138 and an outboard portion 140. The outboard portion 140 is of a thickness which is greater than the inboard portion 138. Additionally, the outboard portion 140 may gradually reduce in thickness to the inboard portion 138.

In other embodiments, as illustrated in FIGS. 4 and 6, the sealing ring 40A comprises a first portion 134, a second portion 136A and a third portion 142. The first portion 134 may be of a substantially constant thickness or have a portion which gradually reduces in thickness toward the second portion 136A. Also, the second portion 136A may be of a substantially constant thickness or have a portion which gradually reduces in thickness toward the third portion 142. Additionally, the third portion 142 may be of a thickness which is substantially constant. In these embodiments, the first portion 134 may be of a thickness which is greater than the second portion 136A and the second portion may be of a thickness which is greater than the third portion 142.

Referring now to FIGS. 3-4, the hub assembly 30 comprises a hub 144. The hub 144 is rotatably disposed on the axle housing 24 using one or more bearings 146 disposed between the hub 144 and the axle housing 24. In an embodiment, the bearings 146 are disposed about and engaged with the axle housing 24 before the inner rotary seal 88 and the outer rotary seal 90 are advanced during the manufacture of the wheel end assembly 20. Operating in this manner prevents misalignment of the seals 88, 90 on the sealing ring 40, 40A, 40B during assembly.

The hub assembly 30 may be configured to hold a wheel assembly (not depicted) which is coupled with the hub 144 using a plurality of wheel studs 148. The hub 144 may be attached to the axle 35 as mentioned hereinabove and be drivingly engaged therewith. The hub 144 is an annular member having an inner surface 150, an outer surface 152, and a hub conduit 154, 154A formed therethrough.

As illustrated in FIG. 3, at least a portion of the inner surface 150 of the hub 144 has a stepped cylindrical shape. In an embodiment and as illustrated in FIG. 5, the inner surface 150 comprises one or more recesses 156, 158. The outer surface 152 of the hub 144 defines a hub flange 160. The hub flange 160 may be an annular protuberance having a plurality of perforations formed therethrough in which the wheel studs 148 are disposed. Further, the hub flange 160 engages the wheel assembly and the brake drum.

The hub conduit 154, 154A is formed substantially axially through the hub 144. In an embodiment, the hub conduit 154 is as described in WO2013/154976, the entire disclosure of which is hereby incorporated by reference. The hub conduit 154 includes an inlet 162 formed adjacent the inboard end 86 of the hub assembly 30. The inlet 162 is disposed adjacent to the inner rotary seal 88 and the outer rotary seal 90. In an embodiment, the inlet 162 is formed in the inner surface 150 of the hub 144 between the inner rotary seal 88 and the outer rotary seal 90. An outlet 168 of the hub conduit 154 is formed adjacent to an outboard end 170 of the hub 144. A portion of the hub conduit 154 adjacent the outlet 168 may have an increased diameter with respect to a remaining portion of the hub conduit 154 and, in an embodiment, comprises threads formed therein for receiving a fastener 172 such as, for example, an axle bolt or an axle stud.

Figure 10:
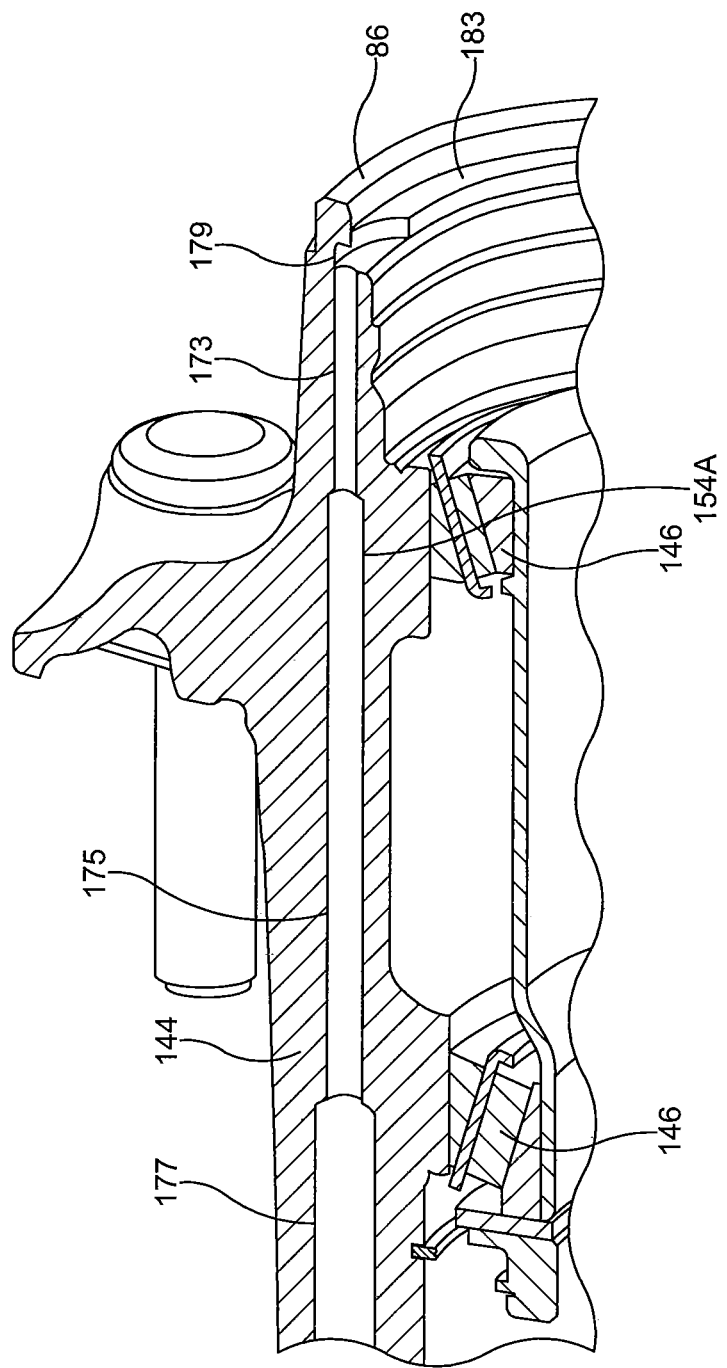
FIG. 10 depicts a partial sectional view of an embodiment of the wheel end assembly in accordance with the invention having portions thereof removed for clarity.
Figure 11:
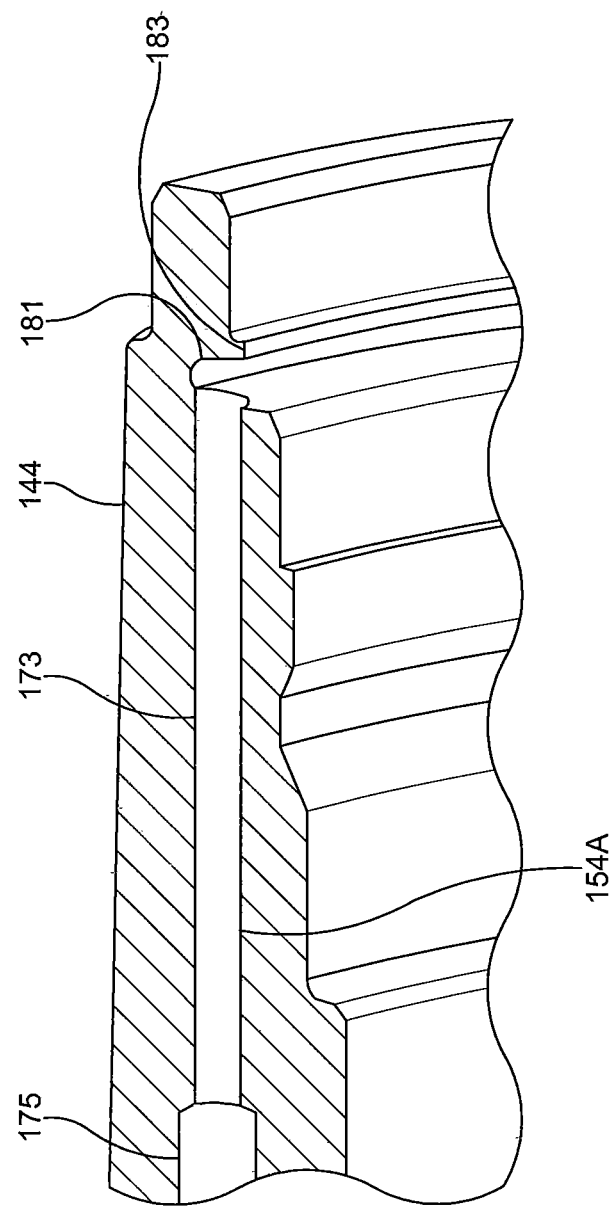
FIG. 11 depicts a partial sectional view of an embodiment of a hub suitable for use in the embodiments of the wheel end assembly.
Figure 12:
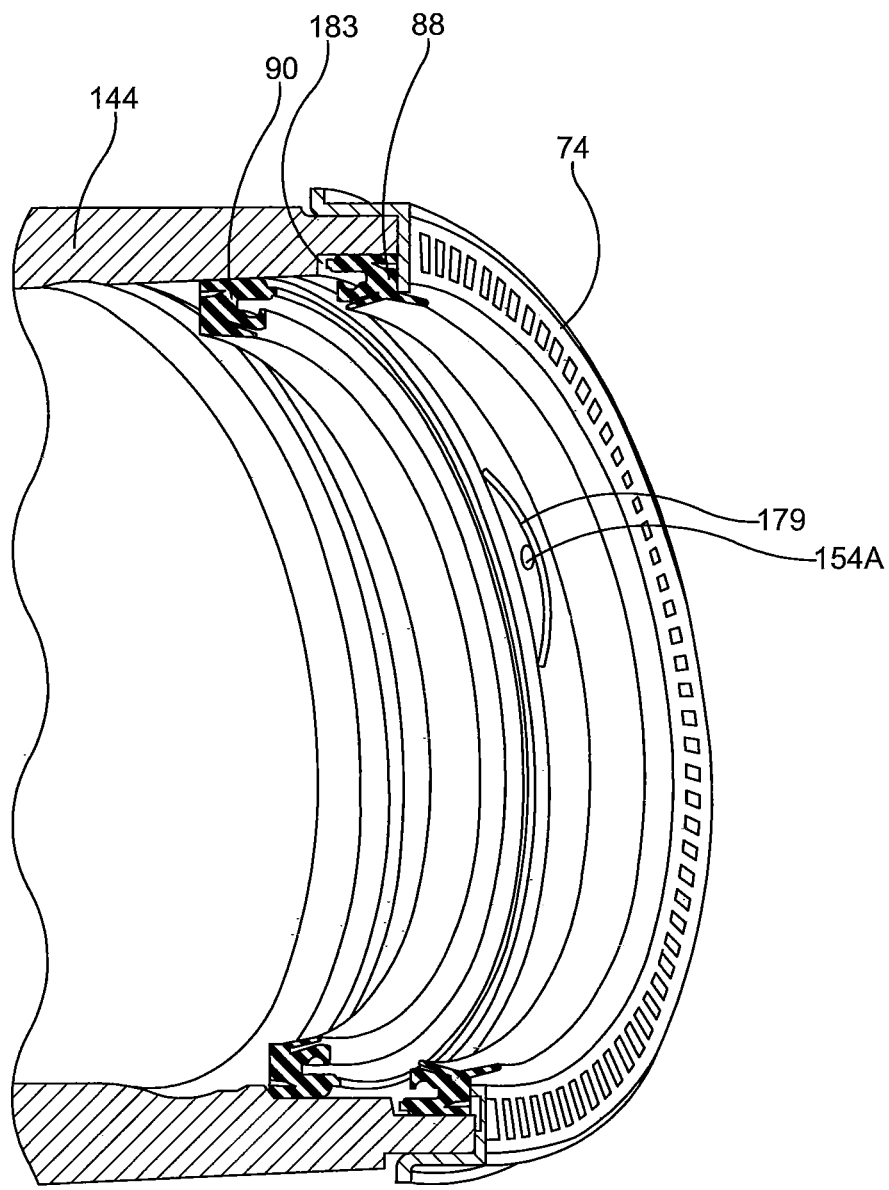
FIG. 12 depicts a partial sectional view of an embodiment of the wheel end assembly in accordance with the invention having portions thereof removed for clarity.

In another embodiment, the hub conduit 154A is configured as illustrated in FIG. 10. In an embodiment, the hub conduit 154A comprises an inlet portion 173, a middle portion 175, and an outlet portion 177; each portion 173, 175, 177 having a different diameter. The hub conduit 154A inlet portion 173 may be formed adjacent to the inboard end 86 of the hub assembly 30. The inlet portion 173 is in fluid communication with the chamber 98 between the inner rotary seal 88 and the outer rotary seal 90. In an embodiment, as illustrated in FIG. 10, the inlet portion 173 is in fluid communication with the chamber 98 via a slot 179. In an embodiment, the slot 179 may have a hemispherical shape. In another embodiment, as illustrated in FIG. 11, the inlet portion 173 is in fluid communication with the chamber 98 via an annular groove 181 formed in the inner surface of the hub 144. The annular groove 181 may be positioned circumferentially about the chamber 98 and axially between the outer rotary seal 90 and a shoulder 183. As illustrated in FIG. 22, in yet another embodiment, the inlet portion 173 is in fluid communication with the chamber 98 via a bore 179A. In an embodiment, the bore 179A may be disposed generally perpendicular to the middle portion of the hub conduit 154A. In another embodiment the bore 179A may be disposed at an oblique angle to the remaining portions of the hub conduit 154A. The bore 179A may be formed by drilling through the inner surface of the hub 144.

Referring back to FIG. 10, the outlet portion 177 of the hub conduit 154A is formed adjacent to the outboard end 170 of the hub 144. In an embodiment, threads are formed in the outlet portion 177 of the hub conduit 154A for receiving the fastener 172. The outlet portion 177 of the hub conduit 154A includes an increased diameter with respect to the inlet portion 173 of the hub conduit 154A. The outlet portion 177 of the hub conduit 154A is in fluid communication with the inlet portion 173 of the hub conduit 154A via the middle portion 175 of the hub conduit 154A. The middle portion 175 of the hub conduit 154A has an increased diameter with respect to the inlet portion 173 of the hub conduit 154A. However, the middle portion 175 of the hub conduit 154A has a diameter which is less than a diameter of the outlet portion 177 of the hub conduit 154A. The embodiments illustrated in FIGS. 10 and 11 allow for a greater wall thickness in certain portions of the hub 144, which increases the durability of the hub 144.

As illustrated in FIGS. 3-6, a bearing seal 174 is disposed between the hub 144 and the axle housing 24. The bearing seal 174 may be formed from an elastomeric material and may include at least one reinforcing member provided therein. The bearing seal 174 militates against lubricant used with the bearings 146 from contacting the outer rotary seal 90. Therefore, the bearing seal 174 militates against lubricant applying an axial force to the outer rotary seal 90 which may displace the outer rotary seal 90 or enable lubricant to enter the chamber 98.

The bearing seal 174 is disposed at a location inboard from the bearings 146 and outboard of the outer rotary seal 90. In an embodiment, as illustrated in FIG. 3, the bearing seal 174 is disposed in the hub 144 and is in sealing contact with the hub 144 and the axle housing 24. In an embodiment, as illustrated in FIG. 4, the bearing seal 174 is disposed in the hub 144 and is in sealing contact with the hub 144 and the sealing ring 40A. More particularly, the bearing seal 174 is in sealing contact with the third diameter surface 118 of the sealing portion 42A. In both embodiments illustrated in FIGS. 3 and 4, the bearing seal 174 is engaged with the inner surface 150 of the hub 144 and rotates with the hub 144. As best illustrated in FIG. 5, in an embodiment, a sealing edge 176 of the bearing seal 174 is in sealing contact with the outer surface 26 of the axle housing 24. As best illustrated in FIG. 6, in an embodiment, the sealing edge 176 of the bearing seal 174 may be in sealing contact with an outer surface of the sealing ring 40A.

The inner rotary seal 88 may be disposed between the sealing ring 40, 40A, 40B and the hub 144. Additionally, the inner rotary seal 88 may be formed from an elastomeric material and include at least one reinforcing member provided therein. The inner rotary seal 88 militates against a pressurized fluid, such as air, used in the tire inflation system 200 from exiting the chamber 98 between the inner rotary seal 88 and the outer rotary seal 90.

The inner rotary seal 88 is disposed at a location inboard of the outer rotary seal 90 and outboard from the tone ring 74. More particularly, the inner rotary seal 88 is provided inboard of the shoulder 183 (see FIGS. 10 and 11) so that an outboard end of the inner rotary seal 88 abuts the shoulder 183 and an inboard end of the inner rotary seal 88 abuts the tone ring 74. In this embodiment, the shoulder 183 acts as a positive stop for the inner rotary seal 88 when the wheel end assembly 20 is manufactured. The inner rotary seal 88 is disposed on one of the sealing ring 40, 40A, 40B and the hub 144, and the inner rotary seal 88 is in sealing contact with the remaining one of the sealing ring 40, 40A, 40B and the hub 144. In an embodiment, the inner rotary seal 88 is attached to the inner surface 150 of the hub 144. In such embodiments, the inner rotary seal 88 rotates with the hub 144 and a sealing edge 179 of the inner rotary seal 88 is in sealing contact with the outer surface of the sealing ring 40, 40A, 40B. As best illustrated in FIGS. 5 and 6, the inner rotary seal 88 also comprises a lip portion 178. The lip portion 178 contacts the outer surface of the sealing ring 40, 40A, 40B to militate against dirt and/or other debris from entering the chamber 98.

The outer rotary seal 90 may be disposed between the hub 144 and the sealing ring 40, 40A, 40B. The outer rotary seal 90 may be formed from an elastomeric material and include at least one reinforcing member provided therein. The outer rotary seal 90 militates against a pressurized fluid, such as air, used in the tire inflation system 200 from entering the area between the hub 144 and the axle housing 24 and exiting the area between the inner rotary seal 88 and the outer rotary seal 90. Therefore, the outer rotary seal 90 militates against pressurized fluid applying an axial force to the bearing seal 174 which may displace the bearing seal 174 or enable pressurized air to pass the bearing seal 174.

The outer rotary seal 90 is disposed at a location inboard of the bearing seal 174 and outboard of the inner rotary seal 88. The outer rotary seal 90 is disposed on one of the sealing ring 40, 40A, 40B and the hub 144, and is in sealing contact with the remaining one of the sealing ring 40, 40A, 40B and the hub 144. In an embodiment, the outer rotary seal 90 is attached to the inner surface 150 of the hub 144. In such embodiments, the outer rotary seal 90 rotates with the hub 144, and a sealing edge 180 of the outer rotary seal 90 is in sealing contact with the outer surface of the sealing ring 40, 40A, 40B.

In an embodiment, the inner rotary seal 88 and the outer rotary seal 90 are as described in WO2013/154976. The inner rotary seal 88 and the outer rotary seal 90 are spaced apart from one another and disposed about the outer surface of the sealing ring 40, 40A, 40B. The hub conduit 154, 154A is in fluid communication with the flow passageway 56 formed through the sealing ring 40, 40A, 40B via the chamber 98 located between the inner rotary seal 88 and the outer rotary seal 90. In an embodiment, the inner rotary seal 88 is disposed about the sealing ring 40, 40A, 40B first diameter surface 110, and the outer rotary seal 90 is disposed about the second diameter surface 112. As the first diameter surface 110 is of a diameter which is greater than that of the second diameter surface 112, the inner rotary seal 88 is preferably of a diameter which is greater than a diameter of the outer rotary seal 90. For example, in an embodiment, an inner diameter of the inner rotary seal 88 is greater than an inner diameter of the outer rotary seal 90. Additionally, the inner rotary seal 88 and the outer rotary seal 90 may be disposed in separate recesses 156, 158 formed in the inner surface 150 of the hub 144.

As illustrated best in FIGS. 5 and 6, a space 182 is provided between the bearing seal 174 and the outer rotary seal 90. In an embodiment, as illustrated in FIG. 14, a vent 185 may be provided in the hub 144. The vent 185 may be in fluid communication with the space 182 between the bearing seal 174 and the outer rotary seal 90. The vent 185 is provided to allow pressurized fluid which passes the outer rotary seal 90, and lubricant which passes the bearing seal 174, to be removed from the space 182. Removing pressurized fluid and lubricant from the space 182 militates against lubricant entering the hub conduit 154, 154A and the flow passageway 56, and militates against air entering the axle housing 24.

In an embodiment, the vent 185 is as described in WO2013/154976. The vent 185 may be circumferentially spaced apart from the hub conduit 154, 154A and positioned axially between the bearing seal 174 and the outer rotary seal 90. In an embodiment, one or more vents 185 may be disposed in the hub 144. In an embodiment, the hub 144 includes three vents 185. The one or more vents 185 are formed in the hub 144 and each comprise a conduit 189 extending from the inner surface 150 to the outer surface 152 thereof. Each conduit 189 is in fluid communication with the space 182 on an end and with the atmosphere on an opposite end.

The one or more vent 185 conduits 189 may be oriented in a perpendicular relationship with the axle housing 24. However, in other embodiments (not depicted), the one or more vent 185 conduits 189 are not limited to being oriented in a perpendicular relationship with the axle housing 24. For example, the one or more vent 185 conduits 189 may be oriented in an oblique relationship with the axle housing 24.

Figure 13:
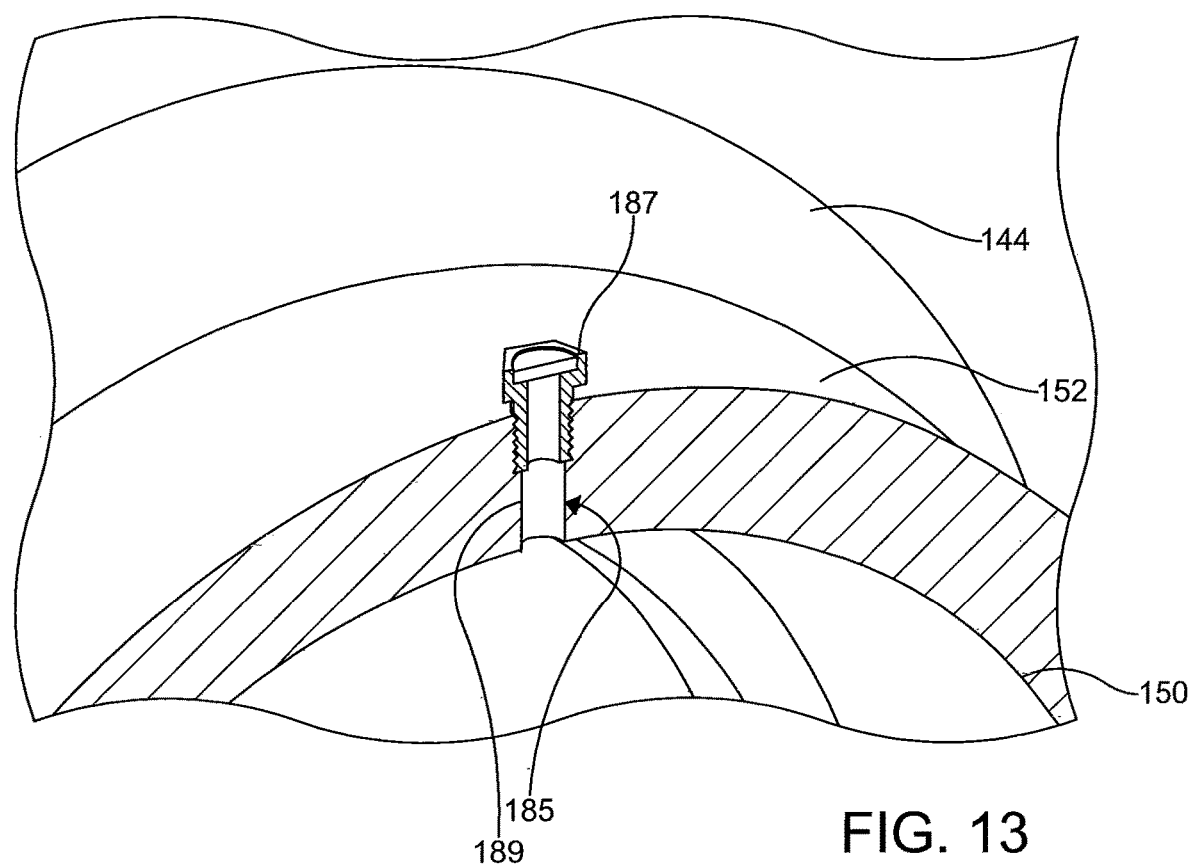
FIG. 13 depicts a partial sectional view of an embodiment of a hub assembly suitable for use in the embodiments of the wheel end assembly.

In certain embodiments, as illustrated in FIG. 13, an outer portion of one or more of the one or more vent 185 conduits 189 is formed having threads. In an embodiment, the threads of the conduit 189 are utilized to attach a vent filter 187 within the vent 185 conduit 189. The vent filter 187 prevents dirt and debris from entering the hub 144. As illustrated, the vent filter 187 has threads which engage the threads on the outer portion of the vent 185 conduit 189.

Referring now to FIGS. 3, 4 and 20, the fastener 172 is engaged with the hub 144 and is hollow, having a conduit 184 formed therethrough. The fastener conduit 184 is in fluid communication with the conduit 154, 154A formed in the hub 144. The fastener 172 is disposed through the flanged end 37 of the axle 35 such that it is sealingly engaged with the outlet 168 or outlet portion 177 (see FIG. 10) of the hub conduit 154, 154A. The fastener conduit 184 facilitates fluid communication between the hub conduit 154, 154A and a hose assembly (not shown).

Figure 18:
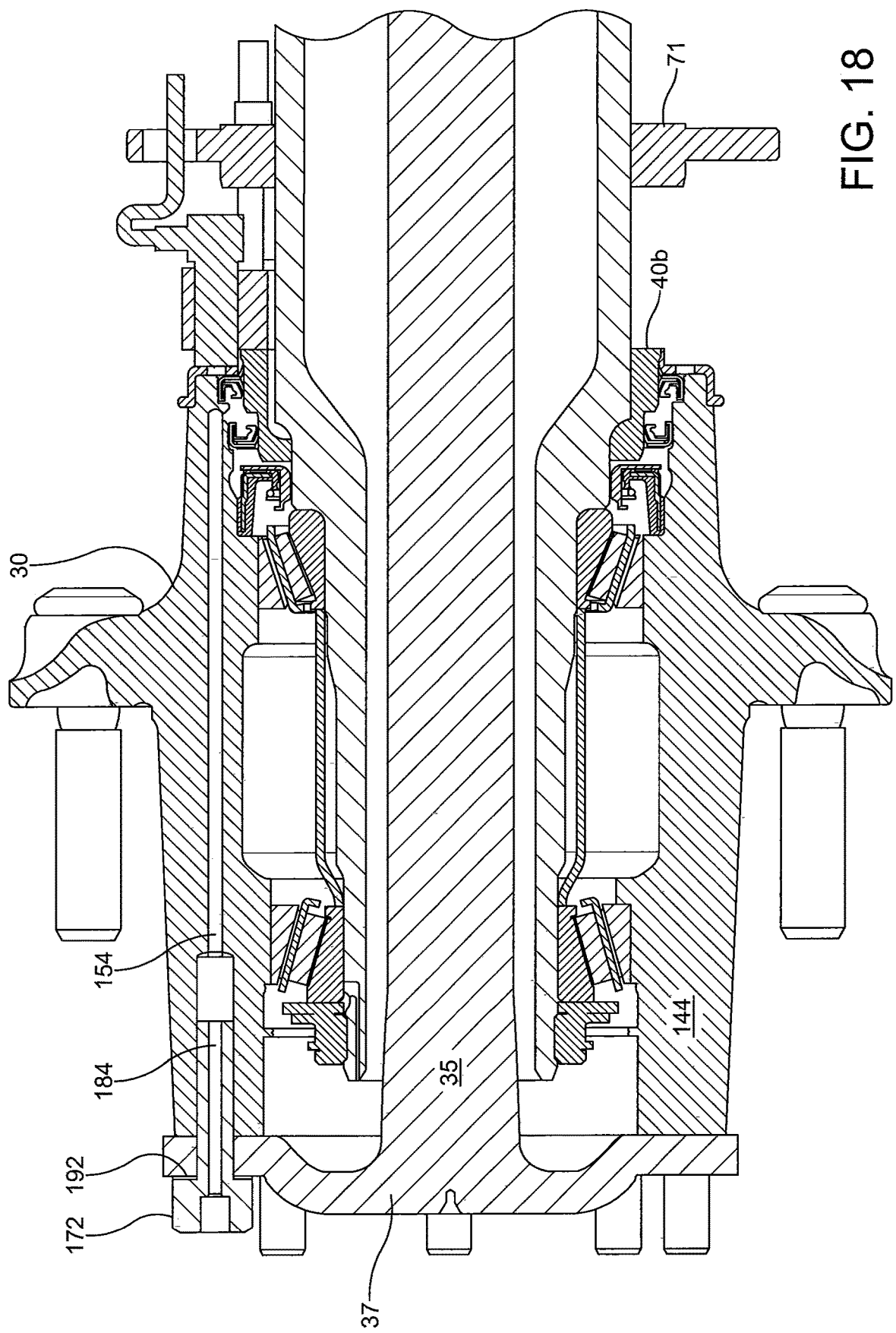
FIG. 18 depicts a cross-sectional view of a portion of the drive axle of FIG. 2 along line 18-18 and illustrates another embodiment of the wheel end assembly in accordance with the invention.
Figure 19:
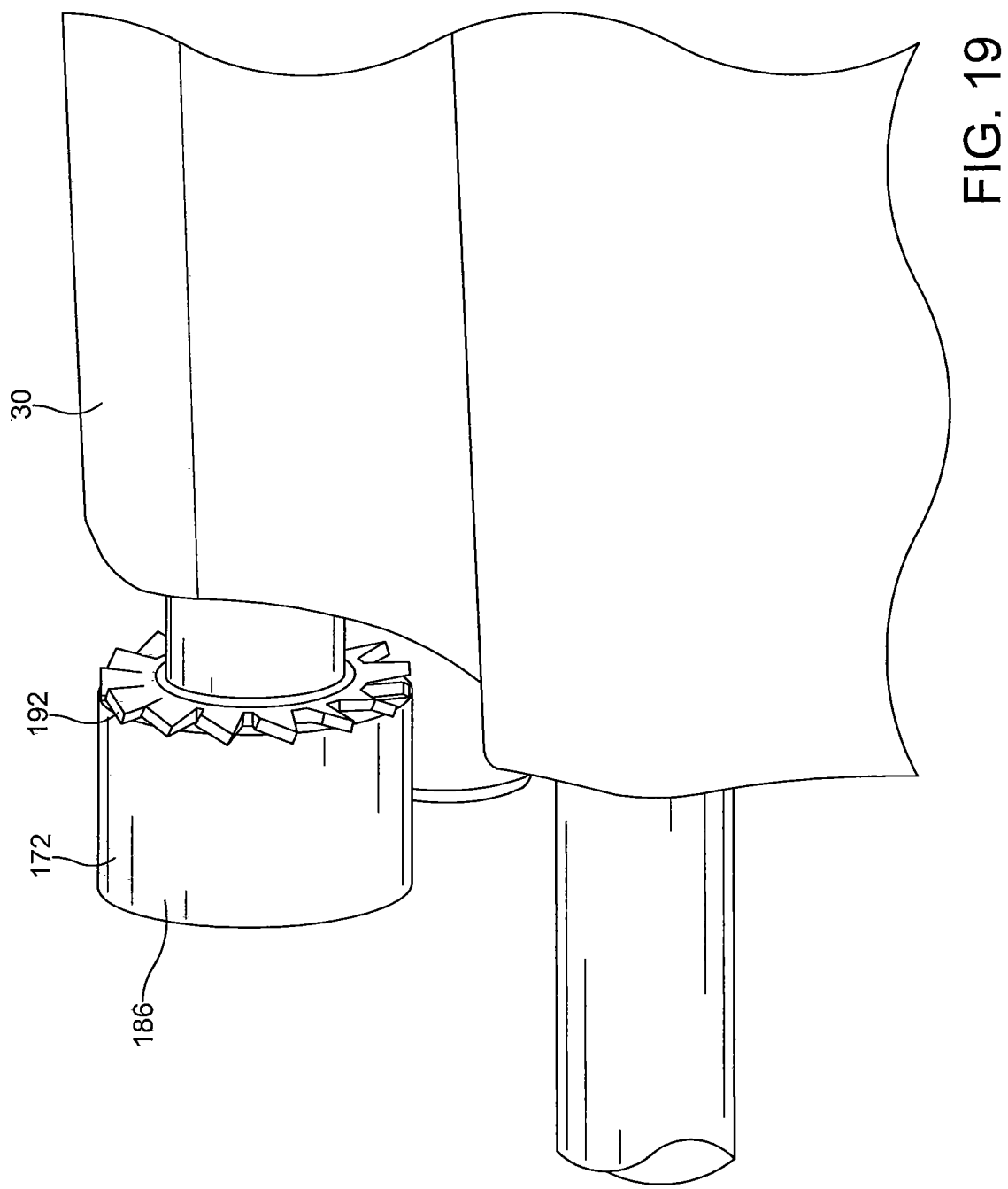
FIG. 19 depicts a perspective view of a portion of the wheel end assembly of FIG. 18.

In the embodiments shown in FIGS. 3-4, the fastener 172 may be an axle bolt. In an embodiment, a head portion 186 of the axle bolt abuts the flanged end 37 of the axle 35. In an embodiment, as illustrated in FIGS. 18-19, a locking washer 192 is positioned between the head portion 186 and the flanged end 37 of the axle 35. In this embodiment, the locking washer 192 is disposed around a portion of the fastener 172. The locking washer 192 abuts an outboard end surface of the flanged end 37 of the axle 35 and the fastener head portion 186. The locking washer 192 is provided between the fastener 172 and the axle 35 to provide a seal at an interface of the fastener 172 and the axle 35 so that pressurized air directed through the hub conduit 154, 154A is transferred to the fastener conduit 184, and vice versa. In an embodiment, the locking washer is as-described in provisional U.S. patent application Ser. No. 62/174,627, the entire disclosure of which is hereby incorporated by reference. However, in other embodiments (not depicted), the locking washer may be replaced with a non-locking sealing washer. The sealing washer may be located in a similar position to, and perform a similar function to, the locking washer 192 described above. In still other embodiments (not depicted), the wheel end assembly 20 does not include a washer. In these embodiments, a sealing material such as, for example, Loctite® Dri-Loc® Threadlocker (not depicted), a product of the Henkel Corporation who's United States headquarters is located at One Henkel Way, Rocky Hill, Conn. 06067, may be utilized to seal the interface between the fastener 172 and the axle 35. In these embodiments, the sealing material is located on the threaded portion of the fastener 172. In other embodiments (not depicted), the wheel end assembly 20 may comprise a washer (locking or non-locking) and the sealing material. In further embodiments (not depicted), the wheel end assembly 20 comprises a washer, a sealing material, and a thread sealant. In an embodiment, the thread sealant may be a tape. In still further embodiments (not depicted), the wheel end assembly 20 comprises the locking washer and the thread sealant. In an additional embodiment (not depicted), the wheel end assembly 20 comprises a non-locking washer and thread sealant. In yet another embodiment (not depicted), the wheel end assembly 20 comprises a sealing material and thread sealant.

Referring back to FIGS. 3-4, the head portion 186 of the axle bolt embodiment of the fastener 172 may have a hexagonal cross-sectional shape. The axle bolt has the conduit 184 formed therethrough and an outer surface 188 which has a thread formed thereon. The thread formed in the outer surface 188 of the axle bolt engages the thread formed in the portion of the hub conduit 154, 154A adjacent the outboard end 170 of the hub 144. A recess 190 having a thread formed thereon is formed in the head portion 186 of the axle bolt. In other embodiments, the fastener 172 may be an axle stud.

The hose assembly may comprise a fitting (not depicted), a hose (not depicted), and a valve fitting (not depicted). In an embodiment, the valve fitting is sealingly engaged with the fastener 172. The valve fitting is in fluid communication with the fastener 172 via a conduit (not depicted) formed through the hose and the fitting. The valve fitting is sealingly engaged with a tire valve (not depicted).

In use, the wheel end assembly 20 facilitates fluid communication between the hose assembly and the pump conduit of the tire inflation system 200. When pressurized air is pumped into, or a pressure is applied to the flow passageway 56 from the pump conduit 69, the pressurized air travels through the chamber 98 between the inner rotary seal 88 and the outer rotary seal 90, the hub conduit 154, 154A and the fastener conduit 184 to the hose assembly.

The pump (not depicted) is capable of pumping the pressurized air into, or applying a pressure to, the hub conduit 154, 154A and is activated by a controller (not depicted) in response to a pressure within a wheel assembly (not depicted) as determined by a pressure sensor (not depicted) in communication with the controller. Alternately, the pump may be activated manually by a vehicle operator in a vehicle that the tire inflation system 200 is incorporated in, at periodic intervals to ensure each of the wheel assemblies are maintained at a desired pressure, in response to changes in ambient temperature, or in response to changes in terrain.

While various embodiments of the presently disclosed subject matter have been described above, it should be understood that they have been presented by way of example, and not limitation. It will be apparent to persons skilled in the relevant art that the disclosed subject matter may be embodied in other specific forms without departing from the spirit or essential characteristics thereof. The embodiments described above are therefore to be considered in all respects as illustrative, not restrictive.

What is claimed is:

1. A wheel end assembly for a tire inflation system, comprising:
   an axle housing;
   a sealing ring disposed on said axle housing, said sealing ring having a conduit formed therethrough;
   a hub rotatably disposed on said axle housing, said hub disposed adjacent said sealing ring and having a conduit formed therethrough;
   an inner rotary seal disposed between said sealing ring and said hub;
   an outer rotary seal disposed between said sealing ring and said hub, wherein said conduit formed through said hub is in fluid communication with said conduit formed through said sealing ring by way of an area between said inner rotary seal and said outer rotary seal; and
   a bearing seal disposed between said sealing ring and said hub, said bearing seal disposed outboard of said outer rotary seal, wherein said inner rotary seal, said outer rotary seal, and said bearing seal are each in sealing contact with said sealing ring.

2. The wheel end assembly for a tire inflation system according to claim 1, wherein said sealing ring further comprises:
   a sealing portion coupled with a sensor portion, wherein said sealing portion is disposed outboard of said sensor portion.

3. The wheel end assembly for a tire inflation system according to claim 2, wherein said sealing ring sensor portion further comprises:
   a curvilinear inner surface, and an outer surface defining a first surface, a second surface, and a third surface, wherein said first surface and said second surface are oppositely disposed at an oblique angle to said third surface;
   said first surface and said second surface each comprising a fastener aperture perpendicularly disposed therethrough; and
   said third surface including an inlet of said sealing ring conduit.

4. The wheel end assembly for a tire inflation system according to claim 3, wherein sensor portion inner surface further comprises:
   a first surface and a second surface, wherein said second surface has a larger diameter than said first surface.

5. The wheel end assembly for a tire inflation system according to claim 3, wherein sensor portion further comprises:
   a pair of axially extending bolt pockets; and
   a coaxially extending aperture disposed through each bolt pocket, whereby a pair of fasteners is disposed through said bolt pockets and said sealing ring.

6. The wheel end assembly for a tire inflation system according to claim 3, wherein said sealing ring sensor portion further comprises:
   a first portion of said sealing ring conduit, said first portion in fluid communication with said inlet; and
   said first portion including a plurality of conduits.

7. The wheel end assembly for a tire inflation system according to claim 3, wherein:
   a pump conduit is coupled with said inlet of said sealing ring conduit; and
   said pump conduit is disposed through a brake backing plate located about said axle housing.

8. The wheel end assembly for a tire inflation system according to claim 2, wherein said sealing ring sealing portion comprises:
   a first portion, a second portion, and a third portion, wherein said first portion is inboard of said second portion, and said second portion is inboard of said third portion; and
   said inner rotary seal is sealingly disposed about said first portion, said outer rotary seal is sealingly disposed about said second portion, and said bearing seal is sealingly disposed about said third portion.

9. The wheel end assembly for a tire inflation system according to claim 8, said sealing ring sealing portion comprising:
   said first portion having a greater outer diameter than said second portion, and said second portion having a greater outer diameter than said third portion; and
   wherein said first portion and said second portion define a first outboard facing surface therebetween, and said second portion and said third portion define a second outboard facing surface therebetween.

10. The wheel end assembly for a tire inflation system according to claim 9, wherein said sealing ring sealing portion comprises:
    a second portion of said sealing ring conduit, wherein said second portion is in fluid communication with said first portion; and
    one or more outlets of said sealing ring conduit is formed in said first outboard facing surface.

11. The wheel end assembly for a tire inflation system according to claim 10, wherein:
    said second portion of said sealing ring conduit comprises a plurality of flow conduits aligned with said first portion of said sealing ring conduit; and
    each flow conduit is in fluid communication with an outlet of said one or more outlets formed in said first outboard facing surface.

12. The wheel end assembly for a tire inflation system according to claim 11, wherein:
    said second portion of said sealing ring conduit comprises three separate flow conduits; and
    said three flow conduits define three outlets in said first outboard facing surface.

13. The wheel end assembly for a tire inflation system according to claim 3, wherein:

a sensor mount is coupled with the sealing ring sensor portion;

said sensor mount comprises an aperture therethrough having a longitudinal axis substantially parallel with a longitudinal axis of said sealing ring; and a fastener is disposed through said sensor mount aperture and said sensor portion second surface fastener aperture.

14. The wheel end assembly for a tire inflation system according to claim 13, further comprising:

an anti-lock brake system sensor disposed through said sensor mount aperture.

15. The wheel end assembly for a tire inflation system according to claim 1, wherein:

said hub conduit includes an outlet at an outboard end thereof;

a fastener is disposed in said hub conduit outlet, said fastener comprising a conduit therethrough in fluid communication with said hub conduit, and a head portion; and a locking washer disposed about said fastener wherein said locking washer abuts said fastener head portion.

\* \* \* \* \*